US008223402B2

(12) United States Patent
Yao

(10) Patent No.: US 8,223,402 B2
(45) Date of Patent: Jul. 17, 2012

(54) COLOR TRAPPING ON A HALFTONED BI-LEVEL BITMAP

(75) Inventor: Meng Yao, West Linn, OR (US)

(73) Assignee: Xerox Corporation, Norwalk, CT (US)

(*) Notice: Subject to any disclaimer, the term of this patent is extended or adjusted under 35 U.S.C. 154(b) by 687 days.

(21) Appl. No.: 12/434,824

(22) Filed: May 4, 2009

(65) Prior Publication Data

US 2010/0277770 A1 Nov. 4, 2010

(51) Int. Cl.
*G06K 15/00* (2006.01)
(52) U.S. Cl. ........ 358/3.06; 358/1.9; 358/2.1; 358/3.13; 358/3.22; 358/3.15; 382/162; 382/167; 382/261; 382/266; 382/274; 345/612; 345/613; 345/615
(58) Field of Classification Search ............ 358/1.9, 358/2.1, 3.06, 3.13, 3.22, 3.15, 3.24, 3.28, 358/518; 382/162, 167, 261, 266, 274; 345/612, 345/613, 615
See application file for complete search history.

(56) References Cited

U.S. PATENT DOCUMENTS

| | | | |
|---|---|---|---|
| 6,377,711 B1* | 4/2002 | Morgana | 382/274 |
| 6,842,268 B1* | 1/2005 | van Strijp et al. | 358/3.06 |
| 2011/0243429 A1* | 10/2011 | Yao | 382/162 |

* cited by examiner

*Primary Examiner* — Jacky X Zheng
(74) *Attorney, Agent, or Firm* — Philip E. Blair; Fleit Gibbons Gutman Bongini & Bianco P.L.

(57) ABSTRACT

What is disclosed is a novel system and method for color trapping on halftoned bi-level bitmaps. Color edges are detected and edge pixels that need to be trapped are identified. The number of pixels qualified as edge pixels eligible for color trapping can be up to a pre-determined number of pixels away from the color edge. Estimates for the continuous-tone values are obtained for the dominant colors on each side of the two-color edge. The contone value of the dominant color on the opposing side of the two-color edge is assigned to the qualified edge pixels. Qualified edge pixels are re-halftoned using their assigned contone value so that halftones for one color are extended beyond the edge into the other color. The re-halftoned edge pixels are combined with the original bitmap to produce a new bitmap for the image. The new bitmap is then provided to an image output device.

20 Claims, 17 Drawing Sheets

| 1 (M) | 1 (M) | 2 (M) | 2 (C) | 3 (C) | 3 (C) |
|---|---|---|---|---|---|
| 1 (M) | 1 (M) | 2 (M) | 2 (C) | 3 (W) | 3 (C) |
| 4 (M) | 4 (M) | (X) (M) | 5 (C) | 6 (W) | 6 (C) |
| 4 (M) | 4 (M) | 5 (W) | 5 (C) | 6 (C) | 6 (C) |
| 7 (M) | 7 (M) | 8 (M) | 8 (C) | 9 (C) | 9 (C) |
| 7 (M) | 7 (M) | 8 (M) | 8 (C) | 9 (C) | 9 (C) |

COLOR TRAPPING ON A HALFTONED BI-LEVEL BITMAP

TECHNICAL FIELD

The present invention is directed to systems and methods for color trapping on halftoned bi-level bitmaps in a digital imaging system.

BACKGROUND

In computer graphics, the term "bitmap" means "map of bits" or a spatially mapped array of bits, and refers to a type of file format used to store digital images. Raster images in general may be referred to as bitmaps whether synthetic or photographic, in files or in memory. In some contexts, the term bitmap implies one bit per pixel, while the term "pixmap" is used for images with multiple bits per pixel. Halftone prints can be produced from bi-level images that indicate the presence or absence of ink at a particular location within the image. Variation of halftone dot sizes controls tonal values within a clustered-dot halftone print. A halftone image file can be viewed as a bitmap. Each bit is used to indicate whether a pixel is on or off.

Color halftone printing devices make use of different channels, e.g., Cyan (C), Magenta (M), Yellow (Y), and Black (K), to define colors. Thus, color halftone prints may include a plurality of monochromatic bitmaps. Each monochromatic bitmap defines the presence or absence of dots for a particular channel. Color management techniques may be applied to halftone prints by modification of continuous-tone (contone) image data prior to halftoning. Color management via modification of contone image data requires that pages be rendered twice, once for a proof and once for printing plates. However, rendering pages twice can result in different dot structures on the proof and the plates.

When printing, for example, using a color inkjet printer, the color is applied at once to the paper. Each color generally ends up where it is expected. When printing, in commercial printing presses, a document consisting of more than one color of ink requires that the single page pass through the printing press multiple times as each color is applied to the paper. Sometimes the paper or the plates applying the ink shift. It might be a tiny shift but sufficient to be noticeable. For example, a white gap may appear between a cyan letter that is supposed to be touching a magenta box. When this happens, the color is said to be out-of-register. Color-to-color misregistration refers to misregistration between color separations in a printed image. Such misregistration in printed halftoned images can result in image defects, a primary one being white gaps between color edges.

Methods for correcting for misregistration are known. The general approach is to expand one of the abutting regions' separations to fill the gap or misregistration border region with a color determined to minimize the visual effect when printed. Borders or edges expanded from a region of one color to another in this manner are said to be "spread". A border which has been expanded is referred to as a "trap", and the zone within which color is added is called the "trap zone". Misregistration of colors in a printing device can, in some instances, be compensated for by color "trapping". Trapping is the process of compensating for misregistration by printing small areas of overlapping color where different colored objects meet. Trapping makes these gaps less noticeable, even invisible. Trapping is often accomplished with features built into software algorithms devoted to trapping methods. Many commercial printing devices perform a trapping method.

One trapping method is to simply print using all one color or never allow your colors to touch or get too close. This may not be practical for many print jobs. Another approach is to intentionally print one layer of ink on top of another. This is called overprinting (also known as surprinting). Overprinting is used to help avoid the need for color trapping by intentionally avoiding gaps between touching colors. Depending on the colors printed, varying degrees of noticeable changes may arise in color where the two objects overprint. In some instances, overprinting may be desirable and the results better than trapping. Small amounts of overprinting are often less noticeable than the white space that might occur with untrapped knockouts and may be easier to achieve than trying to set a perfect trap. Overprinting is usually not suitable for non-black colors. For example, when dealing with a cyan and a magenta border, using overprint will change one of the colors to blue due to overlapping of cyan and magenta.

Many image documents are RIP'ed to bi-level data out of considerations for memory and performance. RIP'ing means to be Raster Image Processed. Raster image processing turns vector digital information, such as a PostScript file, into a high-resolution raster image (RIP'ed bi-level bitmap). A Raster Image Processor (RIP) is a relatively common component in document reproduction systems.

Accordingly, what is needed in this art is a color trapping algorithm based upon a halftoned high-resolution bi-level bitmap to effectively deal with color misregistration in complex digital document reproduction devices and to reduce other engine artifacts, such as trailing edge detection, where color intensity falls off sharply at the trailing edge.

BRIEF SUMMARY

What is provided are a novel system and method for color trapping on a halftoned bi-level bitmap in a digital document reproduction system. Color edges are detected and edge pixels that need to be trapped are identified in the received bitmap. Pixels qualified as edge pixels eligible for color trapping can be up to a pre-determined number of pixels away from the color edge and the number of pixels to trap can be set differently for the X and Y dimensions. The separate trapping depth control of X/Y dimensions is achieved by specifying the dimensions of the context window and scaling the detection results accordingly. Advantageously, asymmetrical and multi-pixel trapping along differing dimensions is enabled.

In one embodiment, a bitmap of a halftoned bi-level image is received having a plurality of colored pixels. A candidate pixel is selected from an area of the bitmap having a two-color edge having a first dominant color and a second dominant color. For instance, a cyan-magenta two-color edge has a dominant area of cyan and a dominant area of magenta. The candidate pixel is to be qualified as an edge pixel for color trapping in the two-color edge in a manner in accordance herewith. A window of size n×m is defined which is centered about the candidate pixel. A determination is made whether the candidate pixel is an edge pixel qualified for color trapping. Various embodiments for qualifying a candidate pixel are provided. In one embodiment, this determination is as follows. First, the number of pixels in the window are counted which have at least one adjacent pixel of the first color of the two-color edge (for example, cyan in the cyan-magenta edge) and no adjacent pixels of the second color of the two-color edge (magenta in the cyan-magenta edge). This produces a first count (countC). Next, the number of pixels within the window are counted having at least one adjacent magenta pixel and no adjacent cyan pixels (in, for example, the cyan-magenta edge). This produces a second count (countM). The first and second counts are used, in a manner more fully described herein, to qualify the candidate pixel as an edge pixel for color trapping. If the candidate pixel is a qualified edge pixel for color trapping then continuous-tone color values are estimated for each of the dominant colors of the two-color edge based upon the halftone threshold values of the halftone screens used for halftoning the area of the bitmap wherein the candidate pixel was selected. The estimated contone color value for the dominant color on the opposing side of the two-color edge is then added to the qualified edge pixel for re-halftoning. The process is repeated for all detected edge pixels. The re-halftoned edge pixels are combined with the original bitmap to produce a new halftoned color image. Thereafter, the new halftoned color image is provided to an image output device wherein the image is rendered. Various embodiments have also been provided.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIGS. 5A-D illustrate one embodiment of how a candidate pixel is qualified as an edge pixel eligible for color trapping on a magenta side of a cyan-magenta edge;

FIGS. 6A-D further illustrate the embodiment of FIGS. 5A-D;

FIGS. 7A-D illustrate a 7×7 window to help explain how a candidate pixel is qualified as an edge pixel eligible for color trapping on the cyan side of a cyan-magenta edge;

FIG. 8 shows one example embodiment of estimating a continuous-tone color value for the qualified edge pixel using a 6×6 window comprising 9 estimate windows, with each 2×2 estimate window labeled 1 through 9;

FIGS. 9A-B shows one example 9×9 window to help explain how a candidate pixel which is one pixel away from a cyan-magenta edge is qualified as an edge pixel eligible for color trapping;

FIGS. 10A-C further illustrate the embodiment of FIGS. 9A-B;

FIG. 11 shows a 13×13 window wherein alternating rows and columns immediately adjacent candidate pixel "X" have been deleted in accordance with an alternative embodiment of the present method;

DETAILED DESCRIPTION

Figure 1:
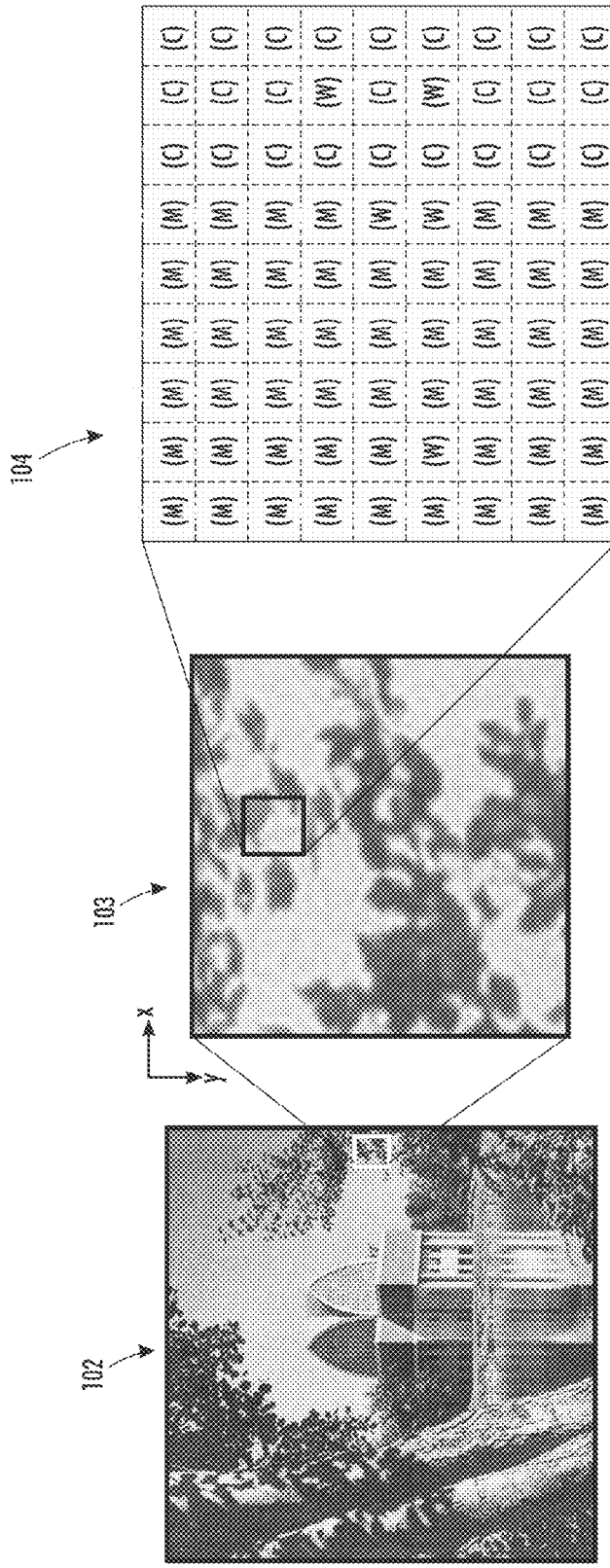
FIG. 1 illustrates an example received bitmap of a halftoned color image whereon various aspects of the present color trapping method are performed.

What is provided are a system and method for color trapping on halftoned bi-level bitmaps. The present method uses a bitmap-based approach to perform color trapping. It enables asymmetrical and multi-pixel trapping, and provides a generic way of preparing the context window to make use of common edge detection algorithms.

It should be understood that one of ordinary skill in this art would be readily familiar with many facets of color science such as, but not limited to, color space, raster image processing, raster graphics, bi-level bitmaps, halftones and halftoning methods, and other techniques generally known in the color science arts. One skilled in this art would be familiar with the text: *"Digital Color Imaging Handbook"*, 1$^{st}$ Ed. CRC Press (2003), ISBN-10: 084930900X, ISBN-13: 978-0849309007, which is incorporated herein in its entirety by reference. One of ordinary skill would be knowledgeable about computer science and software and hardware programming systems and methods sufficient to implement the functionality and capabilities of the present color trapping method, as described herein, in their own computing environments without undue experimentation.

DEFINITIONS

An "image", as used herein, refers to a pattern of physical light comprised of known colors of the light spectrum which are visible by the human eye. When reduced to print, the image generally comprises a plurality of colored pixels arrayed on a media substrate or display device. A printed image (or image print) would be a photograph, plot, chart, and the like, as are generally known. When an image is rendered to a memory or storage, the values of the color pixels are generally stored in any of a variety of formats such as BMP, JPEG, GIF, TIFF, or other formats employed for storing image data on a storage media.

Raster graphics image (or bitmap) is a data structure representing a generally rectangular grid of pixels or points of color values. Raster images are stored in image files using a defined format. A bitmap of an image corresponds bit-for-bit with the original image, generally in a same format used in the display's video memory, or maybe as a device-independent bitmap. The bitmap is characterized by the width and height (X and Y dimensions) of the image in pixels and by the number of bits-per-pixel (a color depth, which determines the number of colors it can represent).

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr. An "adjacent pixel" is a pixel which borders a given pixel.

Edge detection refers to a method known in this art for identifying areas in an image at which the image changes or has discontinuities. A typical edge might be, for instance, a border between a region of magenta and cyan. There are many methods for edge detection. Most can be grouped into two categories, search-based and zero-crossing based. Search-based methods detect edges by first computing a measure of edge strength, usually a first-order derivative expression such as the gradient magnitude, and then searching for local directional maxima of the gradient magnitude using a computed estimate of the local orientation of the edge, usually the gradient direction. Zero-crossing based methods search for zero crossings in a second-order derivative expression computed from the image in order to find edges, usually the zero-crossings of the Laplacian or the zero-crossings of a non-linear differential expression. As a pre-processing step to edge detection, a smoothing stage, typically Gaussian smoothing, is usually applied. The edge detection methods that have been published mainly differ in the types of smoothing filters that are applied and the way the measures of edge strength are computed. As many edge detection methods rely on the computation of image gradients, they also differ in the types of filters used for computing gradient estimates in the x- and y-directions. One edge detection method is disclosed in commonly owned U.S. Pat. No. 6,377,711 entitled: "Methods And Systems For Detecting The Edges Of Objects In Raster Images Using Diagonal Edge Detection", which is incorporated herein in its entirety by reference.

A cyan edge pixel means an edge pixel on the cyan side of the cyan-magenta edge. Such a pixel can be a cyan pixel or any color pixel which is not a magenta pixel (or which contains magenta) such as, for example, a white pixel. A magenta edge pixel means a pixel on the magenta side of the cyan-magenta edge. Such a pixel can be a magenta pixel, or any other color pixel which is not a cyan pixel (or which contains cyan).

An "image input device" is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). A signal of the scanned image data is produced by the scanning device. Such a digital signal contains information about pixels such as color value, intensity, and their location within the scanned image.

An "image output device" is any device capable of rendering the image. The set of image output devices includes digital document reproduction equipment and other xerographic copier systems as are widely known in commerce, photographic production and reproduction equipment, monitors and other displays, computer workstations and servers, including a wide variety of color marking devices, and the like. An inkjet printer is one example color marking device which produces an image from a received signal of image data by the visual integration of color inks deposited onto a media substrate.

To "render" an image is to reduce the image data (or a signal thereof) to viewable form; store the image data to memory or a storage device for subsequent retrieval; or communicate the image data to another device. Such communication may take the form of transmitting a digital signal of the image data over a network.

A continuous-tone (or contone) is a characteristic of a color image such that the image has all the values (0 to 100%) of gray (black/white) or color in it. A continuous-tone can be approximated by millions of gradations of black/white or color values. The granularity of computer screens (pixel size) can limit the ability to display absolute contones.

Halftoning refers to the process of representing a continuous tone (contone) image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications. Due to their stability and predictability, clustered dot halftoning is one of the primary choices for xerographic printing systems. Traditional clustered dot halftones were restricted to a single frequency because they were generated using periodic gratings that could not be readily varied spatially. Halftoning techniques are widely employed in the printing and display of digital images and are necessary because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

General Discussion about Trapping

Trapping is a method which is used to compensate for the small amount that the paper tends to wander as it travels through a printing press or a document reproduction system. Without trapping, unsightly white gaps may appear between two colors that are supposed to be touching. With trapping, one color is made to overlap the other. This allows the colors to keep touching one another, even as the paper wanders. Trapping compensates for mechanical shifts or stretching of paper or plates in the printing process and provides an overlap of colors to prevent unprinted paper from showing in the final printed product. This is not to be confused with the terms "wet trapping" or "dry trapping" which describe behaviors between inks or between ink and paper. Trapping helps preserve the integrity or the shape of an image such as block serifs. In simple trapping, where two colors are involved, the lighter color is spread into the darker color. The darker dominant color generally defines the size and shape of the image. If a purely cyan area borders on a purely magenta area, then a misregistration of the separations would lead to a misregistration of the objects. Either an overlapping or a gap would appear between the objects.

Figure 17:
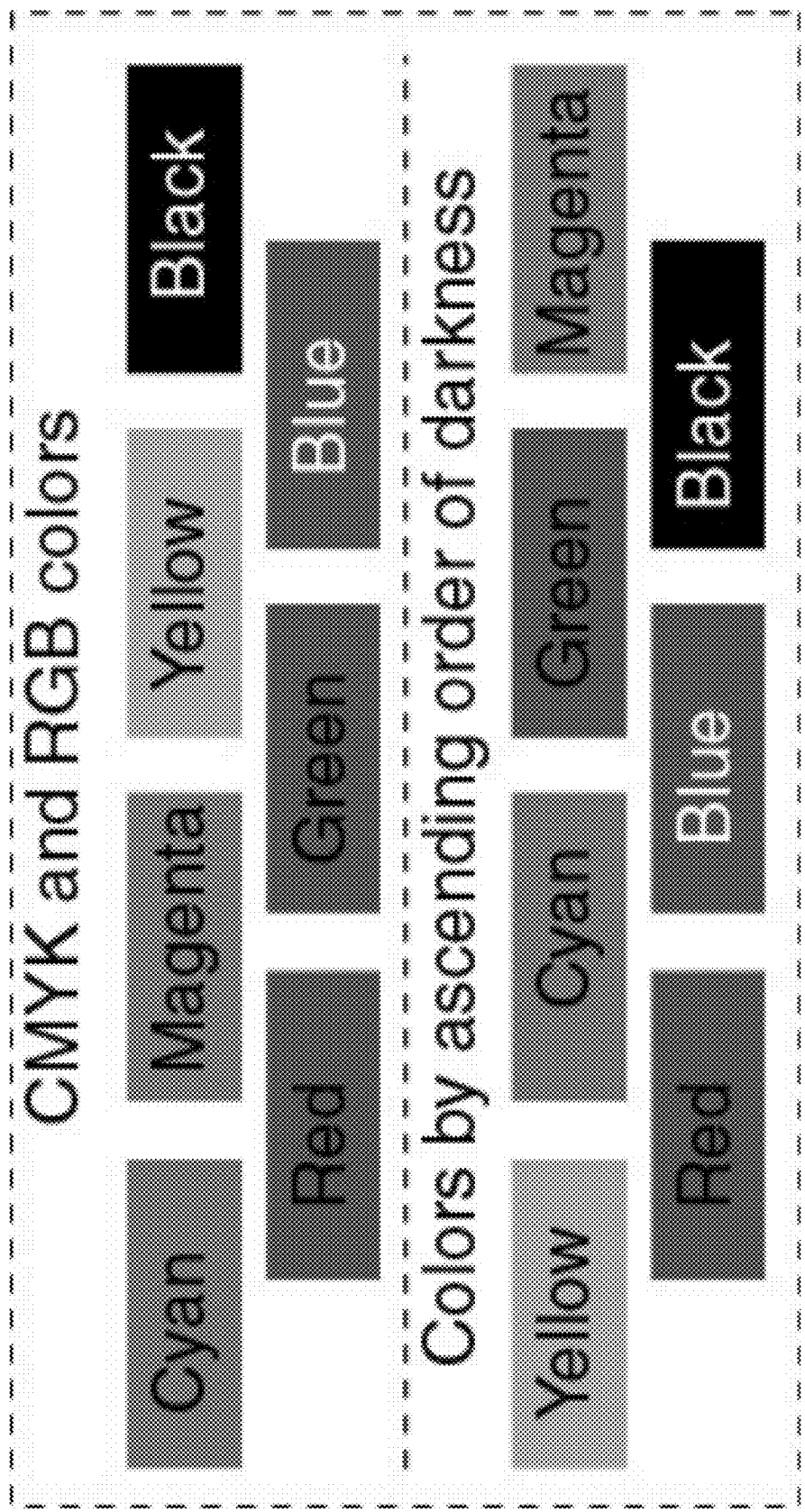
FIG. 17 illustrates a grayscale table for determining which colors are generally considered darker and which are lighter.

Additionally, the weight, or luminosity, of each color needs to be judged, in order to determine which color is stronger, or dominant, and which color is weaker, or submissive. Dominant colors are darker and submissive colors are lighter. Cyan is a dominant color and yellow is a submissive color. A submissive color is less visible when spread into a dominant color than if a dominant color is spread into a submissive color. Once the dominant color is determined, the weaker color is chosen to alter. Dominant colors generally remain unchanged. Submissive colors change in reaction to the dominant color. For example, a dominant cyan remains unchanged while a submissive yellow is spread outward where the two colors come into contact, thus creating a trap. When one color totally surrounds another, they must have either a choke or spread relationship. When a dominant color is surrounded by a submissive color, the dominant color chokes the submissive color (it draws the submissive color underneath its edges). Conversely, when a submissive color is surrounded by a dominant color, it spreads into the dominant color. There are many ways of finding out which color is dominant and which is submissive. The simplest is to print colors and then photocopy the proof. The colors can be transformed into grayscales and visually analyzed for relative darkness. Another method is to determine its Neutral Density values based upon industry standards for density readings of colors based upon their C, M, Y and K components. Another uses R, G, B components to determine relative darkness by applying the following formula: Luminosity=(0.3*Red)+(0.59*Green)+(0.11*Blue). FIG. 17 illustrates a grayscale table that may prove useful to determine which colors are generally considered darker and which are lighter.

It should be appreciated that various aspects of color perception are subjective. Therefore, it is suggested that trapping decision tables be implemented and the colors therein adjusted for specific situations depending on the color processing environments wherein the present method is implemented.

The Present Color Trapping Method

The following discussion assumes at least a 3-color device capable of printing: cyan, magenta, and yellow, on a white background. The bitmap image has already been halftoned and information regarding the halftone screens used to halftone the image have been preserved. The color of each pixel in the example windows (grids) of the accompanying drawings are labeled in parenthesis. For instance, a pixel marked "(M)" is intended to represent a magenta colored pixel. A pixel marked "(C)" is cyan colored pixel. The label "(W)" is a white pixel. The current pixel under consideration as being a possible candidate for color trapping according to the present method, is shown having been marked by "X". A pixel does not have to be cyan or magenta to be a candidate for color trapping as will become more clear herein further.

Reference is first being made briefly to FIG. 1 which illustrates an example color image shown as a gray level image. As shown, image subsection 103 represents a small section of image 102. Subsection 104 represents an even smaller subsection of image subsection 103. Subsection 104 illustrates the individual pixels (cells). FIG. 1 is intended to illustrate one example origin of the pixels of an image as discussed herein. It should be appreciated that the various sections of FIG. 1 are illustrative.

Example Flow Diagram of One Embodiment

Figure 2:
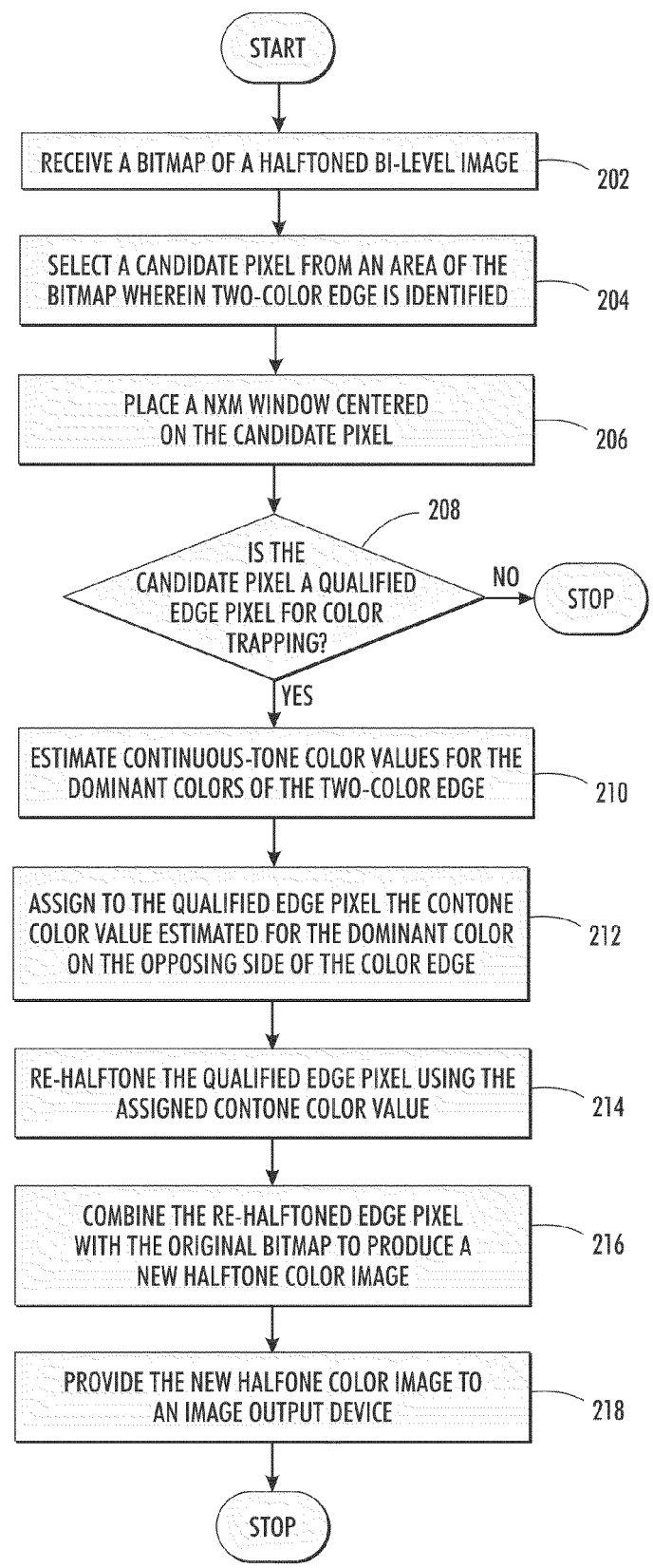
FIG. 2 illustrates a flow diagram of one example embodiment of the present color trapping method.

Reference is now being made to the flow diagram of FIG. 2 which illustrates one example embodiment of the present color trapping method. The example flow diagram of FIG. 2 shows one embodiment wherein a single edge pixel is qualified for color trapping along a two-color edge. It should be fully appreciated that, after an edge pixel has been qualified, more pixels in the bitmap are selected as candidate pixels, qualified and processed accordingly, until all edge pixels in the received bitmap have been processed. The flow diagram of FIG. 2 is intended to illustrate a single iteration of the present color trapping method. Various aspects of the flow diagrams of the present method, and further iterations which process all edge pixels in the received bitmap, are discussed in greater detail with respect to the flow diagrams of FIGS. 3-4 and the embodiments of FIGS. 5-14.

In the example flow diagram of the present color trapping method of FIG. 2, at 202, a bitmap of a halftoned bi-level image is received. At 204, a candidate pixel is selected from an area of the bitmap wherein a two-color edge is identified. The two-color edge has a first side of a first dominant color and a second side of a second dominant color. For example, in an area of the bitmap having a cyan-magenta two-color edge, the first side of the two-color edge would comprise an area of a dominant cyan color and the second side of the two-color edge would comprise an area of a dominant magenta area. The candidate pixel is to be qualified as an edge pixel eligible for color trapping in accordance herewith. At 206, a window of size n×m is placed centered about the candidate pixel. At 208, a determination is made whether the candidate pixel is an edge pixel qualified for color trapping based upon the color values of pixels in the window. If the candidate pixel is not a qualified edge pixel then further processing stops. If the candidate pixel is a qualified edge pixel then, at 210, continuous-tone color values are estimated for the dominant colors of the two-color edge. Estimation of contone values is based upon the halftone threshold values used to color the area of the bitmap wherein the candidate pixel was selected. At 212, the estimated contone color value for the dominant color on the opposing side of the color edge (i.e., the opposite side of the edge wherein the candidate pixel resides) is assigned to the qualified edge pixel. At 214, the qualified edge pixel is re-halftoned using the assigned continuous-tone color value. At 216, the re-halftoned edge pixel is combined with the original bitmap to produce a new halftoned color image. At 218, the new halftoned color image is then provided to an image output device wherein the color image is rendered. Thereafter, further processing stops.

Example Flow Diagram of Another Embodiment

Figure 3:
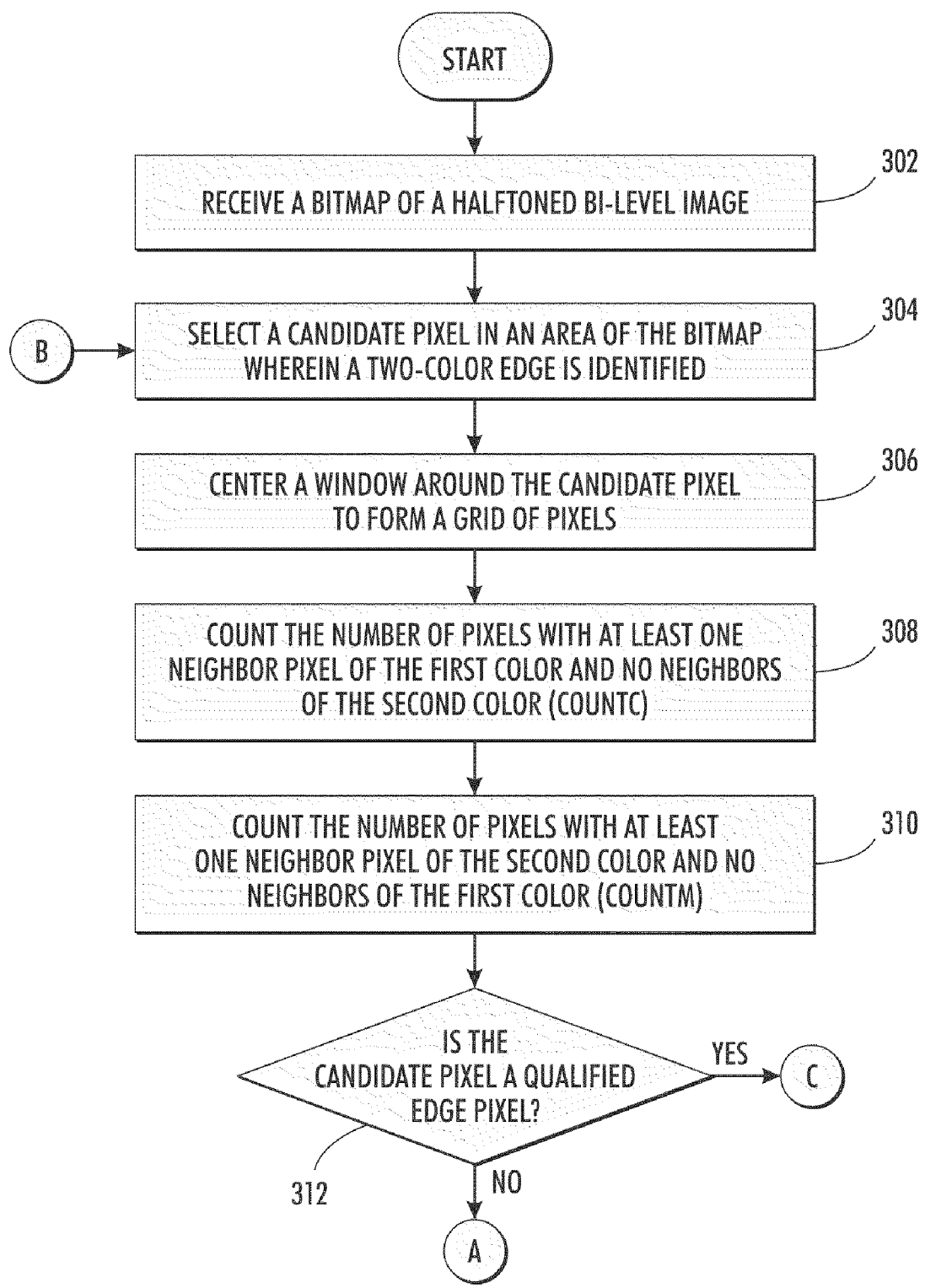
FIG. 3 illustrates a flow diagram of another embodiment of the present color trapping method.

Reference is now being made to the flow diagram of FIG. 3 which illustrates another embodiment of the present color trapping method.

At 302, a bitmap of a halftoned bi-level image is received. The bitmap can be received from a raster image processor after having been RIP'ed in a manner generally known in the arts, or retrieved from a memory or storage. The received bitmap comprises a plurality of pixels each having a color value associated therewith.

At 304, a candidate pixel is selected from an area of the bitmap wherein a two-color edge is identified. The candidate pixel is to be qualified as an edge pixel eligible for color trapping. The two-color edge has a first side of a first color and a second side of a second color. The two-color edge can be any of a cyan-magenta edge, a cyan-yellow edge, a magenta-yellow edge, or any color which borders black, for example, a black-cyan edge. If the two-color edge is a cyan-magenta edge, for instance, then the first side of the two-color edge would be an area of the bitmap dominated by the first color cyan and the second side of the two-color edge would be an area dominated by the second color magenta. Preferably a cyan-magenta edge is selected because such edges tend to produce more visible artifacts caused by misregistration or from other engine artifacts. Artifacts along cyan-yellow edges or at magenta-yellow edges tend to be less visible due to the relatively low visibility of the yellow.

At 306, a window of size n×m is centered on the candidate pixel. In one embodiment, the window forms a 5×5 grid defining a neighborhood of pixels surrounding the candidate pixel. The size of the window may be adjusted based upon a distance (in pixels) the candidate pixel is from the two-color edge. The window does not have to be a square (n=m) as will be discussed herein further with respect to the embodiments of FIGS. 13-15.

At 308, the number of pixels in the window are counted which have at least one adjacent pixel of the first color (for example, cyan in the cyan-magenta edge) and no adjacent pixels of the second color (for example, magenta in the cyan-magenta edge). This produces a first count, countC.

At 310, the number of pixels in the window are counted which have at least one adjacent pixel of the second color (for example, magenta in the cyan-magenta edge) and no adjacent pixels of the first color (for example, cyan in the cyan-magenta edge). This produces a second count, countM. The first and second counts (countC and countM) are used to qualify the candidate pixel as an edge pixel eligible for color trapping. Various embodiments for qualifying pixels are discussed herein further.

At 312, a determination is made whether the candidate pixel is a qualified edge pixel eligible for color trapping on the two-color edge. To qualify the candidate pixel "X" as an edge pixel eligible for trapping on a magenta side of a cyan-magenta edge, the relationship of Eq. 1 (discussed herein further) must be satisfied. To qualify the candidate pixel "X" as an edge pixel eligible for trapping on a cyan side of the cyan-magenta edge, the relationship of Eq. 2 (discussed herein further) must be satisfied. If not a qualified edge pixel, then processing proceeds with respect to node A of FIG. 4. Otherwise, if the candidate pixel is a qualified edge pixel then processing proceeds with respect to node C of FIG. 4.

Figure 4:
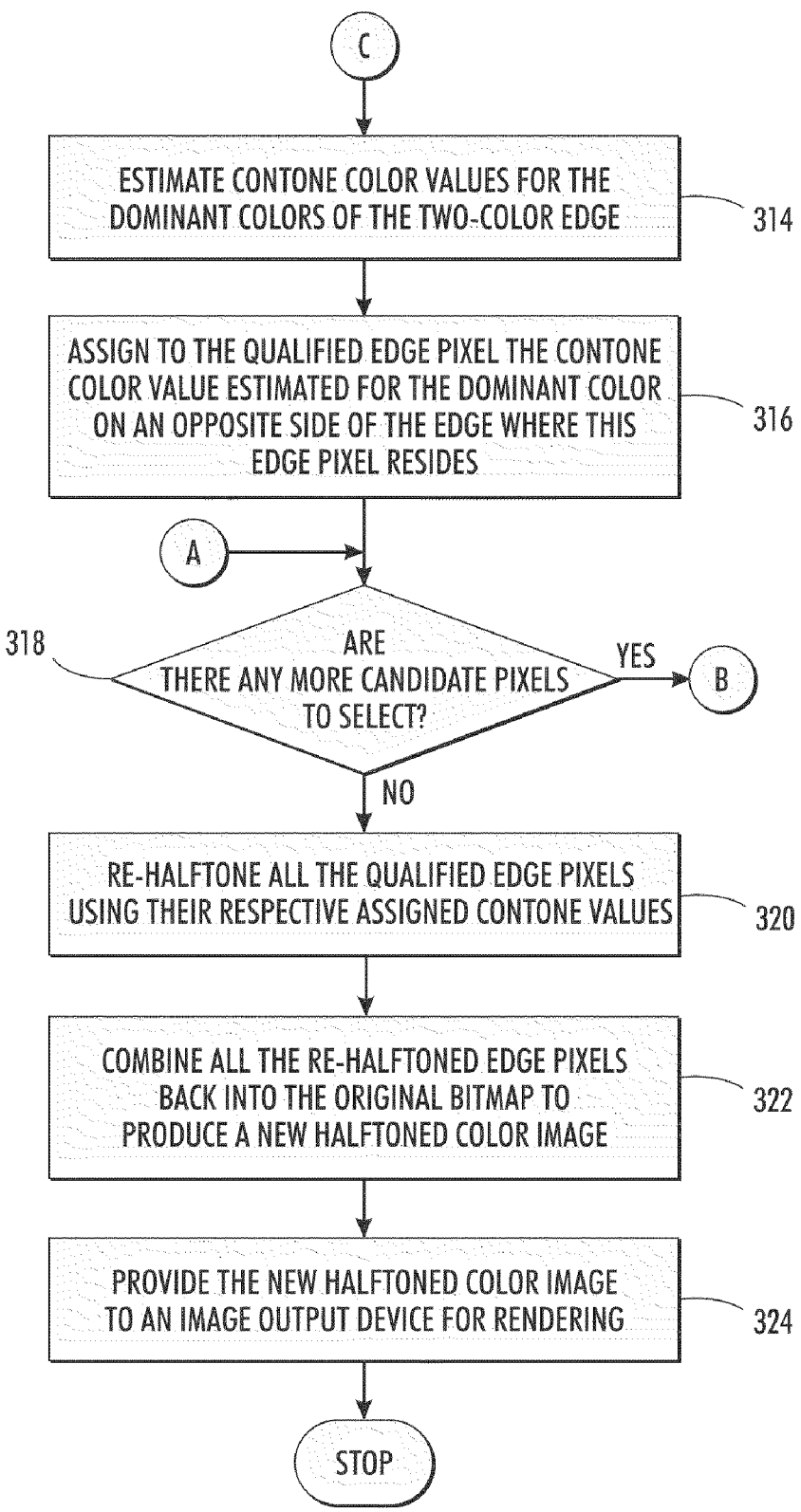
FIG. 4 which is a continuation of the flow diagram of FIG. 3 with processing continuing with respect to node A.

Reference is now made to the flow diagram of FIG. 4 which is a continuation of the flow diagram of FIG. 3 with processing continuing with respect to node A.

At 314, continuous-tone color values are estimated for each of the dominant colors of the two-color edge. Contone values are estimated based upon the halftone threshold values of the halftone screens used to color this area of the bitmap from which the candidate pixel was selected.

At 316, the estimated continuous-tone color value for the dominant color on the opposing side of the two-color edge is assigned to the qualified edge pixel (the current candidate pixel). Methods for estimating the continuous-tone value are provided herein further. The estimated continuous-tone color value may be different than the original continuous-tone color.

At 318, a determination is made whether there are any more pixels to be selected as candidate pixels. If so, then processing repeats with respect to node B of FIG. 3 wherein, at 304, another candidate pixel is selected. Otherwise, at 320, the qualified edge pixels are re-halftoned using their assigned continuous-tone color values. Just the qualified edge pixels are re-halftoned. This is achieved by comparing their estimated continuous-tone values against their corresponding halftone threshold values At 322, the re-halftoned edge pixels are combined with the original bitmap of the color image to produce a new halftoned color image. In one embodiment, these values are logically OR'd into the original bitmap.

At 324, the new halftoned color image is provided to an image output device wherein the color image is rendered or stored for subsequent retrieval. Thereafter, further processing stops.

Method for Qualifying Candidate Pixels

Reference is now made to FIGS. 5A-D which illustrate a portion of a first embodiment of qualifying a candidate pixel as an edge pixel eligible for color trapping. The window of pixels in each of FIGS. 5A-D are intended to be representative of a small area of subsection 103 of image 102 (similar to the window of pixels shown in subsection 104) of FIG. 1. Each of the pixels in the window has a color value indicated by the letter placed at the center of each pixel, magenta (M), cyan (C), and white (W).

Figures 5A, 5B, 5C, 5D:
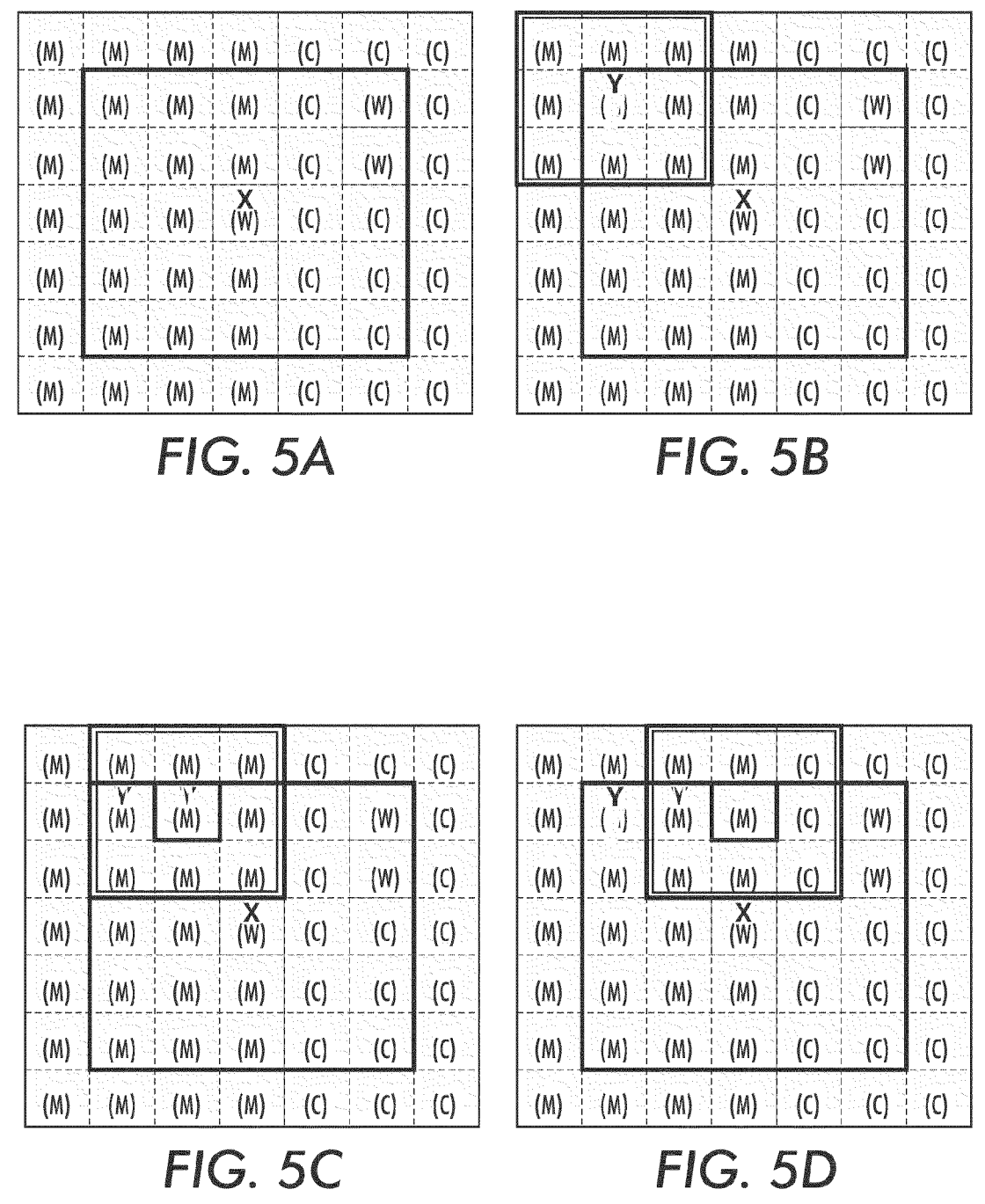

In FIG. 5A, a plurality of magenta pixels are shown arrayed adjacent to a plurality of cyan pixels representing a section of a vertical edge of a cyan-magenta two-color edge. The window has a white center pixel "X" and two white pixels in an area of dominant cyan. A 7×7 window of pixels is used because, in one embodiment, a 5×5 window is centered on candidate pixel "X" and a 3×3 window is used to define a neighborhood of pixels around a given pixel in the window. This requires a 7×7 window because a 5×5 window around the center pixel requires an additional two rows and two columns to encompass all pixels in any given 3×3 neighborhood.

In FIG. 5B, a 3×3 window is shown having been placed around the pixel in the upper left corner of the 5×5 window. The 3×3 neighborhood window is progressively shifted around each pixel in the 5×5 window. As the 3×3 window is shifted, a determination is made whether the pixel at the center of the 3×3 window has at least one adjacent cyan (first color) pixel but no adjacent magenta (second color) pixels in the two-color edge. If so, then the pixel at the center of the 3×3 window is labeled "Z". Otherwise, a determination is made whether the pixel in the center of the 3×3 window has at least one adjacent magenta pixel but no adjacent cyan pixels. If so, then the pixel at the center of the 3×3 window is labeled "Y". Other labeling schemes may be used. Otherwise, the pixel is given no label at all. Once the center pixel has been labeled, the 3×3 window is shifted to the next pixel in the 5×5 window.

In FIG. 5B, the pixel at the center of the current 3×3 window is a magenta (M) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has one adjacent magenta pixel and no adjacent cyan pixels. So, this pixel is labeled "Y". Thereafter, the 3×3 window is shifted to the next pixel to the right in the top row of the 5×5 window and the above determination repeats for the next pixel located at the center of the 3×3 window.

In FIG. 5C, the 3×3 window has been shifted to the next pixel. The pixel at the center of the current 3×3 window is also a magenta (M) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has one adjacent magenta pixel and no adjacent cyan pixels. So, this pixel is labeled "Y". The 3×3 window is then shifted by a single pixel to the right in the top row of the 5×5 window and the same determination is made for the next pixel at the center of the 3×3 window.

In FIG. 5D, the pixel being examined at the center of the 3×3 window is a magenta pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has adjacent cyan pixels, so this pixel cannot be labeled "Y". As such, this particular pixel receives no label. The 3×3 window is shifted by a single pixel to the right along the top row of the 5×5 window. This example continues with respect to FIGS. 6A-D.

Figures 6A, 6B, 6C, 6D:
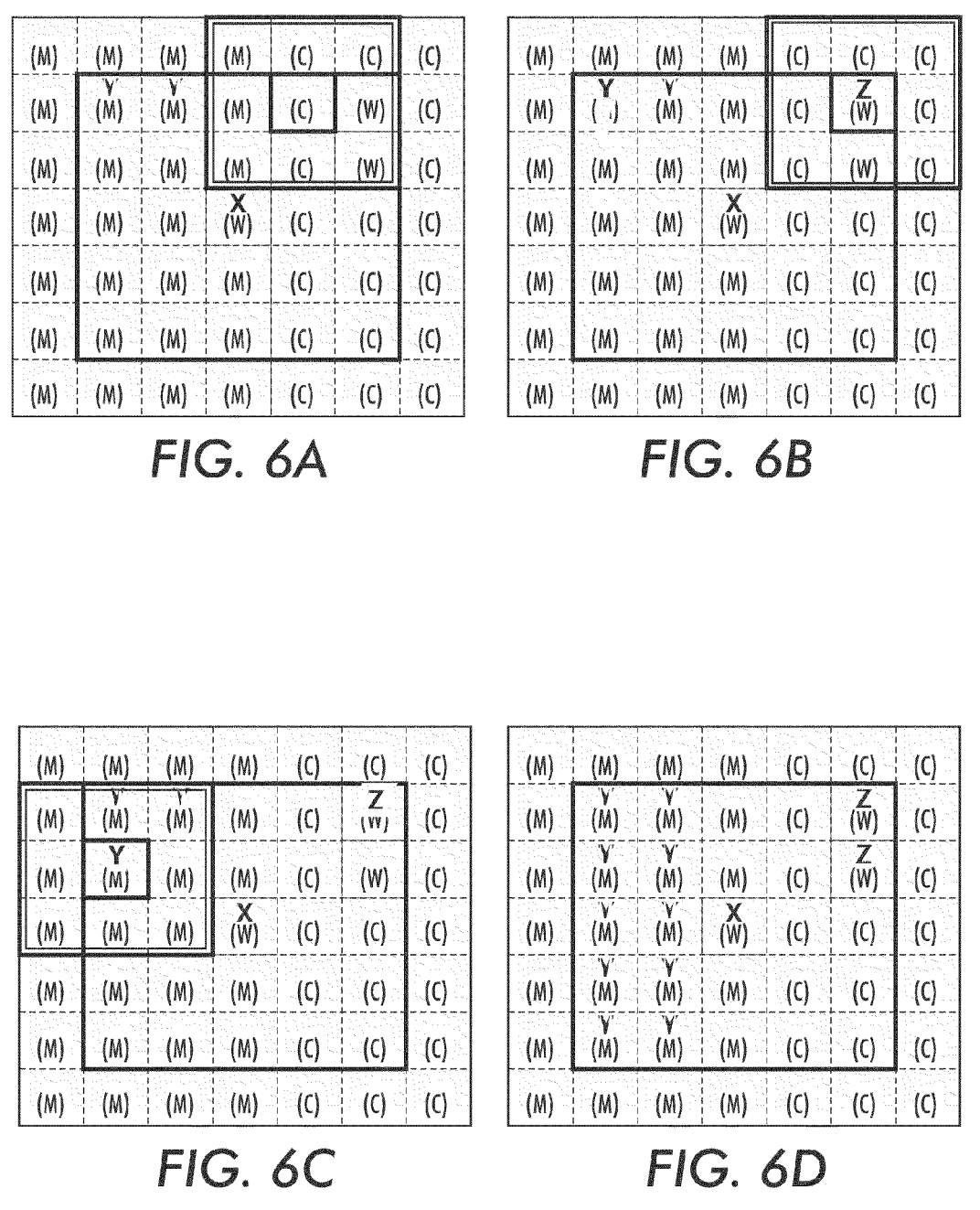

In FIG. 6A, the pixel centered in the current 3×3 window is a cyan (C) pixel. A determination is made whether this pixel has at least one adjacent cyan pixel but no adjacent magenta pixels. This pixel has adjacent magenta pixels, so this pixel cannot be labeled "Z". Next, a determination is made whether this pixel has at least one adjacent magenta pixel and no adjacent cyan pixels. This pixel has adjacent cyan pixels, so this pixel cannot be labeled "Y". As such, this pixel received no label. The 3×3 window is again shifted to the right across the top row of pixels to the upper right corner of the 5×5 window.

In FIG. 6B, the pixel centered in the 3×3 window is a white (W) pixel. A determination is made whether this pixel has at least one adjacent cyan pixel but no adjacent magenta pixels. This pixel has at least one adjacent cyan pixel and does not have any adjacent magenta pixels. Thus, this pixel is labeled "Z". The 3×3 window is shifted to the left-most pixel in the next row of the 5×5 windows and the same determinations are made.

In FIG. 6C, the pixel at the center of the 3×3 window is a magenta (M) pixel. A determination is made whether this pixel has at least one adjacent cyan pixel but no adjacent magenta pixels. This pixel has an adjacent magenta pixel, so this pixel cannot be labeled "Z". Next, a determination is made whether this pixel has at least one adjacent magenta pixel and no adjacent cyan pixels. This pixel has one adjacent magenta pixel and no adjacent cyan pixels. Thus, this pixel is labeled "Y". The 3×3 window is again shifted across each pixel in each row of the 5×5 window. The same determinations, as discussed above, are iterated for each pixel at the center of the 3×3 window. Corresponding labels (or no labels) are assigned accordingly to the above determinations. After examining each of the 25 pixels in the 5×5 window, the end result is shown in FIG. 6D. Pixels which have at least one adjacent magenta pixel and no adjacent cyan pixels have been labeled "Y", and pixels which have at least one adjacent cyan pixel but no adjacent magenta pixels have been labeled "Z". The total number of pixels labeled "Z" are counted and assigned to countC.

In FIG. 6D, countC=5 because there are a total 5 pixels labeled "Z". Next, the total number of pixels labeled "Y" are counted and assigned to countM. In FIG. 6D, countM=10 because there are a total of 10 pixels labeled "Y". Using countC and countM, the candidate pixel will next be qualified as an edge pixel eligible for color trapping.

To qualify the candidate pixel "X" as an edge pixel eligible for color trapping on the magenta (second) side of the cyan-magenta (two-color) edge, the following relationship must be satisfied:

$$(countC > countT) \text{ AND } (countM > countC) \quad (1)$$

where $countT \geq 2$. The variable countT is a user-defined parameter. If countT is too large then it would exclude some of the candidate edge pixels that otherwise would have been qualified. The range should be 0 to 4 for a 5×5 window. A value of 2 is a good value. It should be also appreciated that the variable countT is used because, if we don't use countT and just use the condition (countM>countC) then any pixel in the magenta area would satisfy this condition, even pixels not near the edge.

In the example of FIG. 6D, the candidate pixel "X" is a pixel on the magenta side of the cyan-magenta edge. Thus, Eq. 1 is used to qualify candidate pixel "X". In this instance, countC=5 and countM=10. Substituting these values into Eq. 1, we get: (countC=5>countT=2) AND (countM=10>countC=5). Thus, ((5>2) AND (10>5)). Both conditions of Eq. 1 have been satisfied. Thus, candidate pixel "X" is a qualified an edge pixel qualified for trapping on the magenta (second) side of the cyan-magenta (two-color) edge.

Next will be discussed an example of qualifying a candidate pixel as an edge pixel eligible for trapping on the cyan side of the cyan-magenta edge.

Reference is now being made to FIGS. 7A-D which show a 7×7 window of pixels to help explain how one embodiment of the present color trapping method qualifies a pixel on the cyan side of a cyan-magenta edge. Each of the pixels in the 7×7 window has a color value associated therewith. The labels of the colors of the pixels in the window is consistent with the labeling of FIGS. 5 and 6. The candidate pixel is again labeled "X". This window is comprised of an area dominated by cyan and an area dominated by magenta but also contains a small cyan cluster in the dominant magenta area. A few white pixels are also shown. A 3×3 window is again used to define a neighborhood of pixels around a center pixel. The 3×3 window is progressively shifted across the rows of pixels in the 5×5 window. For each pixel at the center of the 3×3 window, a determination is made whether the pixel has at least one adjacent cyan pixel but no adjacent magenta pixels. If so, then the pixel is labeled "Z". Otherwise, a determination is made whether the pixel has at least one adjacent magenta pixel but no adjacent cyan pixels. If so, then the pixel is labeled "Y". Otherwise, the pixel receives no label.

Figures 7A, 7B, 7C, 7D:
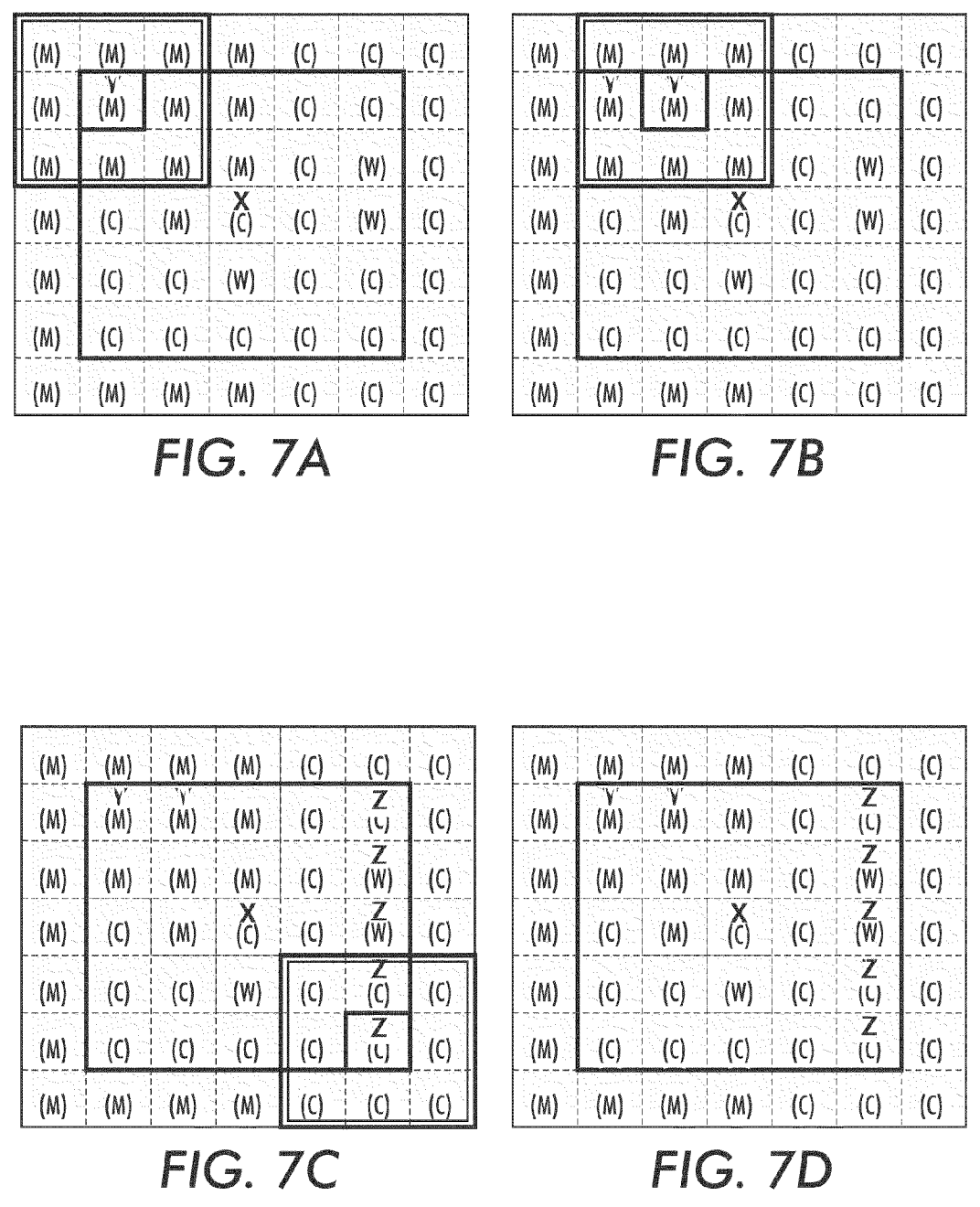

In FIG. 7A, the pixel at the center of the 3×3 window is a magenta (M) pixel. First, a determination is made whether this pixel has at least one adjacent cyan pixel but no adjacent magenta pixels. This pixel has an adjacent magenta pixel so it cannot be labeled "Z". Next, a determination is made whether this pixel has at least one adjacent magenta pixel and no adjacent cyan pixels. This pixel has at least one adjacent magenta pixel and no adjacent cyan pixels. Thus, the pixel is labeled "Y". Thereafter, the 3×3 window is shifted to the right to the next pixel in the top row of the 5×5 window.

In FIG. 7B, the pixel at the center of the 3×3 window is a magenta (M) pixel. This pixel has an adjacent magenta pixels so it cannot be labeled "Z". As with the previously examined pixel (of FIG. 7A), this pixel has at least one adjacent magenta pixel and no adjacent cyan pixels. Thus, the pixel is labeled "Y". The 3×3 window is shifted to the right to the next pixel and the same determinations are iterated for each pixel in the 5×5 window. Corresponding labels (or no labels) are assigned accordingly.

In FIG. 7C, the 3×3 window is shown having been shifted to the right-most pixel in the bottom row of the 5×5 window. For this pixel, a determination is made whether it has at least one adjacent cyan pixel but no adjacent magenta pixels. This pixel has at least one adjacent cyan pixel and no adjacent magenta pixels. Thus, this pixel is labeled "Z". After examining all 25 pixels in the 5×5 window, the end result is shown in FIG. 7D.

Next, the total number of pixels of each label are counted and the values are used to qualify the candidate pixel "X". In FIG. 7D, there are 2 pixels labeled "Y", so countM=2, and there are 5 pixels labeled "Z" so countC=5. Since candidate pixel "X" is on the cyan side of the cyan-magenta edge, Eq. 1 does not apply.

To qualify the candidate pixel "X" as an edge pixel eligible for color trapping on the cyan (first) side of the cyan-magenta (two-color) edge, the following relationship must be satisfied:

$$(\text{count}M > \text{count}T) \text{ and } (\text{count}C > \text{count}M). \quad (2)$$

where countT=2.

In this example, countM=2 and countC=5, i.e., (2>2) AND (5>2). Only one of the conditions has been met. Eq. 2 has not been satisfied. As such, candidate pixel "X" is not an edge pixel qualified for color trapping on the cyan (first) side of a cyan-magenta (two-color) edge. All the other magenta pixels in the 5×5 window of FIG. 7D (not marked "Y") have adjacent cyan neighbor pixels due to the presence of the cluster of cyan located in the dominant magenta area. This makes sense since, when there is a small cyan cluster near an edge of a dominant magenta area, there is no need to add additional cyan in that area. The present method thus ensures that pixels of a cyan cluster located in a magenta dominated area are not incorrectly treated.

Next will be described how to estimate the contone value for the dominant colors on either side of the cyan-magenta edge. For single pixel trapping, magenta can be added to a qualified cyan edge pixel or cyan can be added to a qualified magenta edge pixel, but not both. For two pixel trapping, magenta can be added to a qualified cyan edge pixel and cyan can be added to the qualified magenta edge pixel.

Reference is made to FIG. 8 which shows a plurality of 2×2 estimate windows for a total of 9 windows. The size of an estimate window depends on the resolution. A larger estimate window gives a more accurate color estimate. There should be at least one estimate window located entirely in a dominant cyan area (it does not need to contain all cyan pixels, but needs to be located entirely on the cyan side of the two-color edge) and one estimate window needs to be located entirely within a dominant magenta area. Otherwise, the contone estimates may not be close to a real color value. For each 2×2 estimate window, information about the halftone screens that generated the original bitmap of the color image is used to estimate the continuous-tone color value. The largest value of the 9 separate 2×2 estimate windows is used as the final estimated continuous-tone color value for the area. Estimates are obtained for both cyan and magenta. These estimates represent the dominant colors on either side of the cyan-magenta two-color edge. If an edge pixel qualified for trapping is on the cyan side of the cyan-magenta edge, the estimated magenta contone value is assigned to it so that a magenta pixel may be added to the cyan edge pixel after re-halftoning the magenta contone value at this pixel location. If an edge pixel qualified for trapping is on the magenta side of the cyan-magenta edge, the estimated cyan contone value is assigned to it so that a cyan pixel may be added to the magenta edge pixel after re-halftoning the cyan contone value at this pixel location. This achieves the purpose of trapping the qualified edge pixels. Estimates for the contone values are obtained as follows.

Assume that the continuous-tone value of cyan of the halftoned image is given by C, and that the threshold used to halftone this location in the image is given by $T_c$. Halftoning for cyan would then have been performed according to the following:

If $(C > T_c)$ then cyan is ON.

If $(C \leq T_c)$ then cyan is OFF.

If the contone value of cyan was greater than the halftone threshold then cyan would be turned ON at that pixel location by the halftone screen. If the contone value of cyan is less than or equal to the halftone threshold used to produce cyan at that location then that corresponds to cyan being turned OFF at that pixel location by the halftone screen.

Using the 2×2 estimate windows, we can find all cyan pixels (cyan is ON) and obtain the maximum halftone threshold value of the halftone screen that corresponds to an ON pixel at that location, $T_{c1}$. Similarly, we find all the pixels with no cyan (cyan is OFF) and obtain the minimum halftone threshold value of the halftone screen that corresponds to an OFF pixel, $T_{c2}$. Thus, $T_{c1} < C \leq T_{c2}$, provides us with a range of cyan contone values for a given halftone area. When edges are involved, as in the case of trapping, there may be no cyan pixels in the window, as shown in the estimate windows 1, 4, and 7 of FIG. 8. In such cases, only $T_{c1}$ makes sense. So the value of $T_{c1}$ is used as the estimated contone value for cyan. The largest contone value of the 9 cyan 2×2 estimate windows is used as the final estimated continuous-tone value for the dominant cyan color in that area. A similar reasoning applies to magenta. This applies to other colors as well. It should be pointed out that, for the sole purposes of obtaining the contone estimates, there is no need to use the 2×2 estimate windows. The 2×2 estimate windows are used to extract information needed by Eqs. 3 and 4. Instead, for instance, a 7×7 window can be used which is centered around the current pixel and the values for $T_{c1}$ and $T_{c2}$ found in that window.

Selecting Candidate Pixels

When the largest value of the estimated cyan and magenta continuous-tone values, c_val and m_val, respectively, are not high enough, there is no need to trap this pixel and that pixel can be ignored. This relationship can be given as:

$$(c\_val > \text{HIGH\_COVC}) \text{ AND } (m\_val > \text{HIGH\_COVM}) \quad (3)$$

where HIGH_COVC is the high cyan coverage, and HIGH_COVM is the high magenta coverage. These can be set to 128 (out of 255). Both c_val and m_val have to be greater than a pre-defined cyan and magenta level for a pixel to be considered for color trapping. If not, then the pixel can be ignored.

In order to make sure that only strong cyan-magenta edges get trapped and halftoned areas are not affected much, the following condition may additionally be employed:

$$(c\_min < \text{LOW\_COVC}) \text{ and } (m\_min < \text{LOW\_COVM}) \quad (4)$$

where LOW_COVC is the low cyan coverage, and LOW_COVM is the low magenta coverage, (these can be set to 50), c_min is the minimum of the 9 cyan estimates, and m_min is the minimum of the 9 magenta estimates.

The above, Eq. 3 and 4, together state that this cyan-magenta edge has high coverage cyan and high coverage magenta as well as low coverage cyan and low coverage magenta, i.e., a strong cyan-magenta edge.

If you are considering adding cyan to the current pixel then the current pixel preferably has at least one adjacent cyan pixel in its 3×3 neighborhood. Since any non-cyan pixel is also a possible candidate for color trapping, this requires that the pixel under consideration be at least connected to a cyan cluster. Otherwise, unwanted white pixels, more than a pixel from the edge in medium coverage cyan-magenta areas, will be qualified candidates. Similarly, if you are considering adding magenta to the current pixel then the current pixel has to have a magenta neighbor in its 3×3 neighborhood.

In a 5×5 pixel window, look for cyan pixels and find the maximum threshold value corresponding to the cyan pixels. Thus $$(T'_c \leq C\_LOW\_TH) \text{ and } (T'_m \leq M\_LOW\_TH) \qquad (5)$$

where C_LOW_TH=50 (a pre-determined low threshold value for cyan) and M_LOW_TH=50 (a pre-determined low threshold value for magenta), helps eliminate false candidates since some white pixels around small clusters not far away from a strong cyan-magenta edge may be incorrectly classified as qualified candidates for color trapping, and trapping will expand the size of those clusters.

Rehalftoning Qualified Edge Pixels

Qualified edge pixels are re-halftoned by comparing their largest estimated cyan or magenta continuous-tone values, c_val and m_val, against their corresponding cyan or magenta halftone threshold values. If the qualified edge pixel is on the magenta side of the edge, the estimated cyan contone value is re-halftoned at this pixel location, i.e., if (c_val>$T_{c\_xy}$) then add cyan to the current pixel. If the qualified edge pixel is on the cyan side of the cyan-magenta edge, the estimated magenta contone value is re-halftoned at this pixel location, i.e., if (m_val>$T_{m\_xy}$) then add magenta to the current pixel. It should be appreciated that $T_{c\_xy}$ and $T_{m\_xy}$ represent the cyan and magenta halftone threshold values at pixel location (x,y). The results are OR'ed with the original bitmap to produce the desired halftoned output.

The above-described method uses countC and countM to qualify cyan and magenta edge pixels in a cyan-magenta edge. This method allows up to two pixel trapping, i.e., one cyan edge pixel and one magenta edge pixel can be trapped on the two-color edge. In some cases, especially at high resolutions, it is desirable to trap more than two pixels. The following discussion provides and embodiment that allows multiple pixels to be trapped along each of the X and Y dimensions of the received bitmap. Although the following is focused on cyan-magenta two-color edges, the method equally to cyan-yellow, magenta-yellow, or colors bordering black.

Figures 9A, 9B:
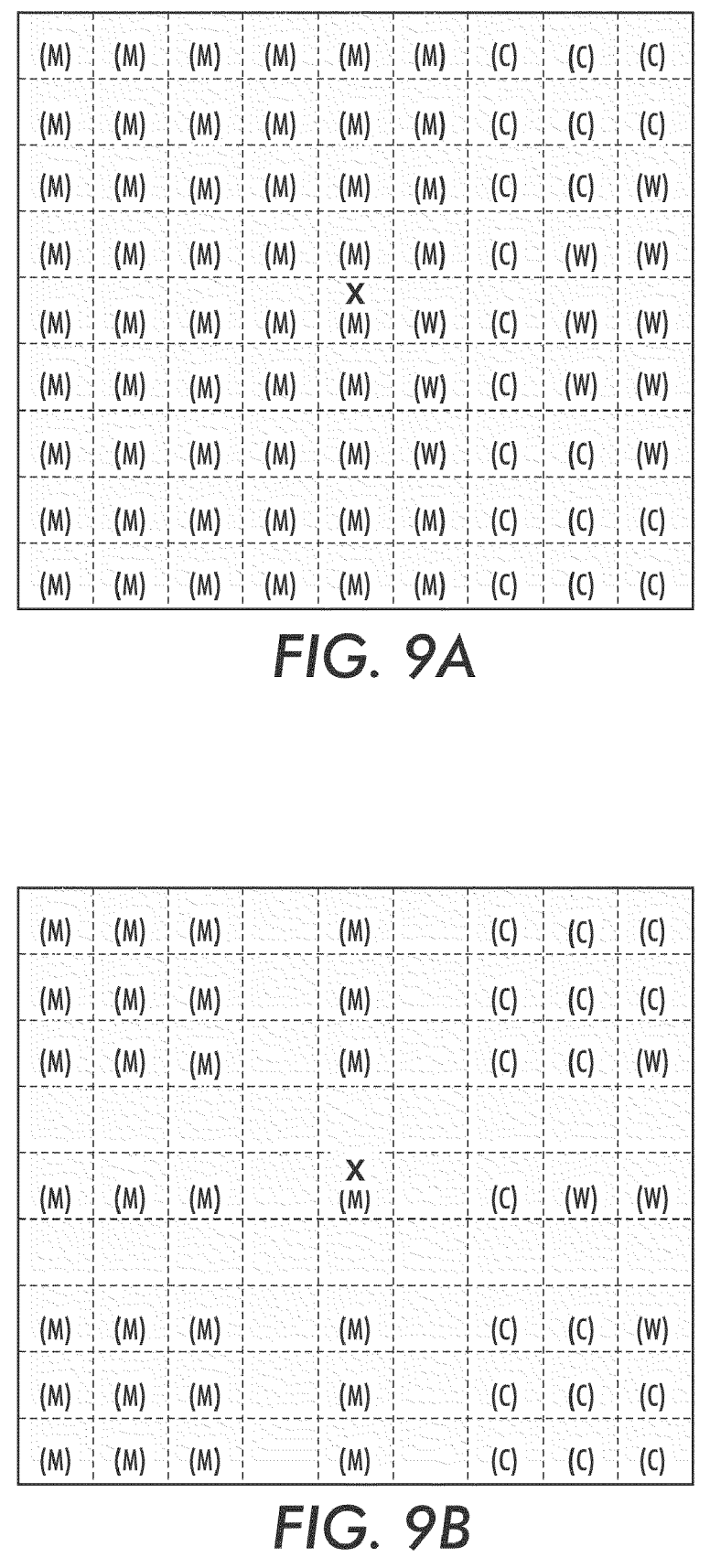

Reference is now being made to FIGS. 9A-B which show one example 9×9 window of pixels to help explain how the present trapping method qualifies pixels which are one pixel away from a cyan-magenta edge. Pixel colors are consistent with their previous usage. The candidate is the white pixel "X". Pixel "X" is one pixel away from the cyan-magenta edge. There is a small cluster of white pixels between the candidate pixel in the dominant cyan area and the vertical cyan-magenta edge. FIG. 9A has a dominant magenta area on the left side of the window and a dominant cyan area on the right side of the window. To achieve this, a single row and a single column immediately adjacent to the candidate pixel "X" are ignored. The ignored rows and columns are shown as shaded regions in FIG. 9B. Pixels in the shaded rows and columns are removed from processing and not considered part of the 5×5 window. Ignoring a single row and column is preferred because it requires the smallest window size for subsequent processing. An alternative would be to skip every other row and column (like sub-sampling the image to a lower resolution), which requires a bigger window size and may miss trapping small edges.

Figures 10A, 10B, 10C:
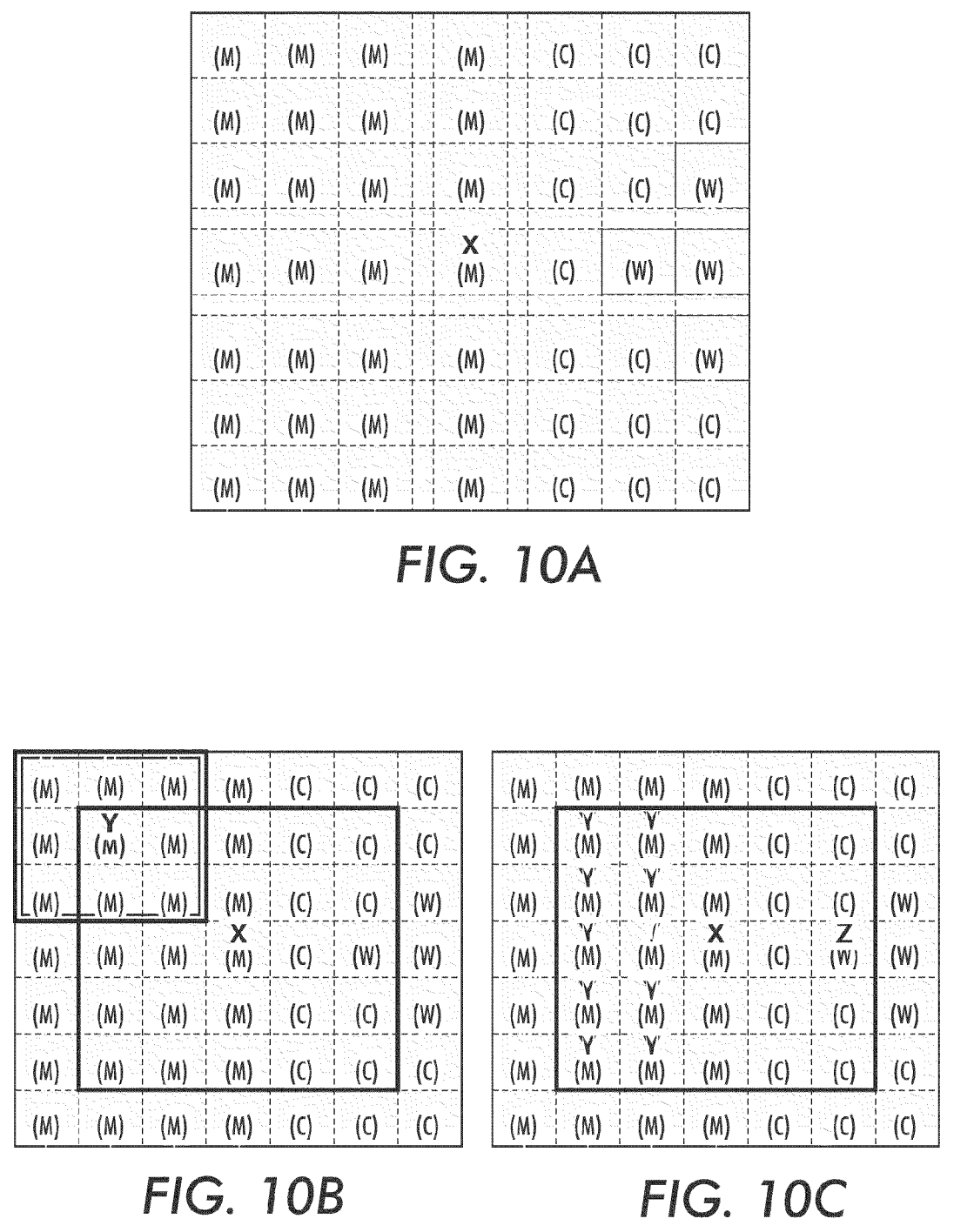

Reference is now made to FIGS. 10A-C which is a continuation of the explanation of FIGS. 9A-B. FIG. 10A shows the window of FIG. 9B with the shaded rows having been collapsed somewhat as explained herein further.

After the rows and columns immediately adjacent the current pixel "X" under consideration have been removed from processing, shown as the shaded rows and columns of FIG. 9B, these are collapsed (FIG. 10A) such that the 5×5 window can be placed around the remaining pixels. The 5×5 window is intended to encompass 25 pixels not including pixels in the shaded areas. FIG. 10B shows the window of FIG. 10A with the shaded rows having been removed from processing. As previously discussed, the 3×3 window is progressively shifted across the rows of pixels such that it gets placed around each pixel in the 5×5 window. For each neighborhood of pixels bounded by the 3×3 window, a determination is made whether the pixel in the center of the 3×3 window has at least one adjacent cyan pixel but not any adjacent magenta pixels. If so, the pixel is marked "Z". Otherwise, a determination is made whether the pixel has at least one adjacent magenta pixel but no adjacent cyan pixels. If so, then the pixel is marked "Y".

In FIG. 10B, the pixel at the center of the 3×3 window is a magenta (M) pixel. This pixel has at least one adjacent magenta pixel and no adjacent cyan pixels. Thus, this pixel is labeled "Y". The 3×3 window is repeatedly shifted across each row of pixels in the 5×5 window. The same determinations are iterated for each pixel. A corresponding label (or no label) is assigned accordingly. After examining each of the 25 pixels in the 5×5 window, the end result of this process having been repeated for all pixels is shown in FIG. 10C. The number of pixels labeled "Z" are counted. In this instance, countC=5. The number of pixels labeled "Y" are counted. In this instance, countM=10. To qualify the candidate pixel as an edge pixel eligible for color trapping on the magenta side of the cyan-magenta edge, the relationship of Eq. 1 must be satisfied. In this example, (countC=5 and countM=10). Substituting these values into Eq. 1, (5>2) AND (10>5). Both conditions are met. Thus, candidate pixel "X" is an edge pixel qualified for color trapping on the magenta side of the cyan-magenta edge.

Figure 11:
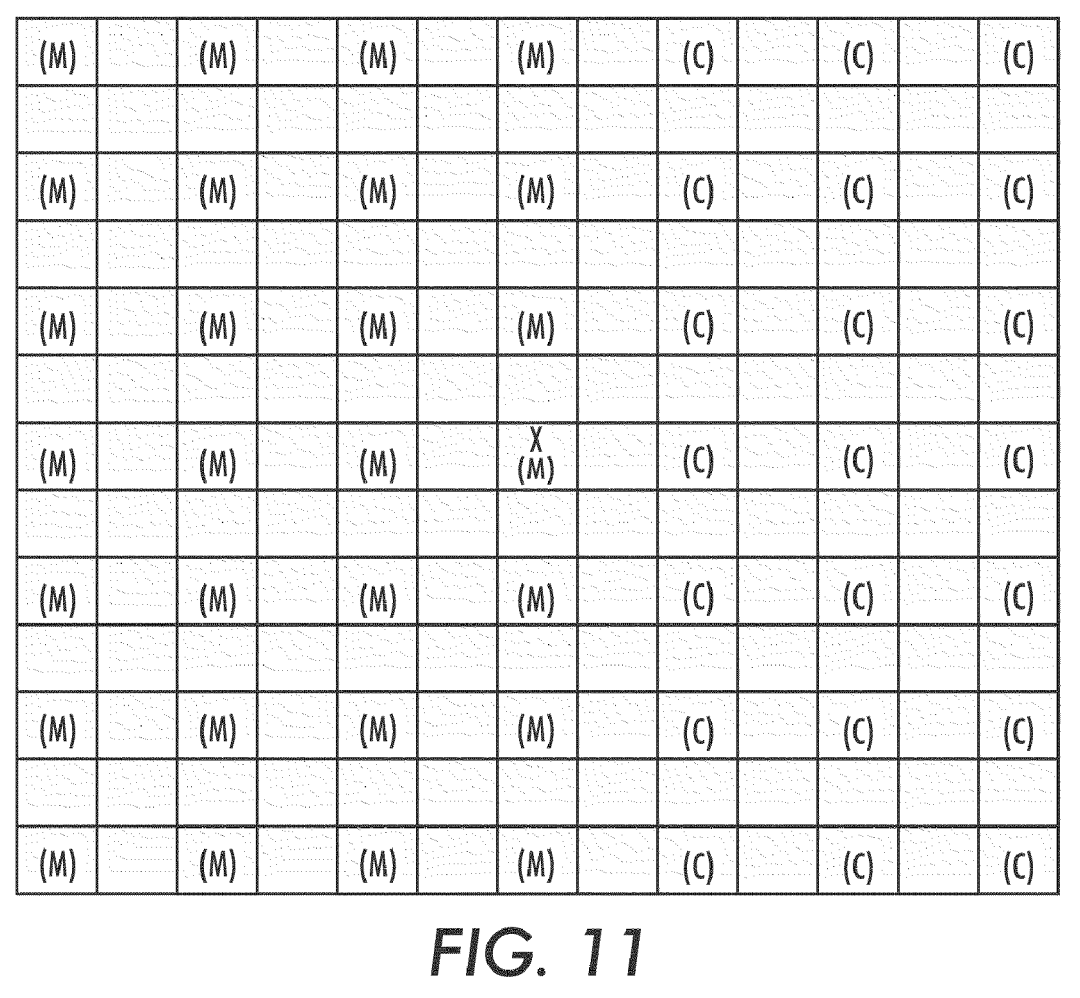

Note that the neighborhood arrangement in FIG. 9A requires a larger cyan/magenta area and, in the case of relatively thin cyan-magenta edges, some qualified edge pixels may be missed. So it would be beneficial to run edge qualification process twice, first using the method described with respect to FIGS. 5 and 6 and then that described with respect to FIGS. 9 and 10 wherein a single row and column are first deleted around the candidate pixel. In another embodiment, alternating rows and columns are deleted around the candidate pixel. FIG. 11 shows a 13×13 window wherein alternating rows and columns immediately adjacent candidate pixel "X" have been deleted. The deleted rows and columns are removed from processing. This reduces the 13×13 window to a 7×7 window.

Alternative Embodiment

What is also provided herein is a method of trapping a different number of pixels in the X and Y dimensions since the above-described color trapping method does not distinguish between X and Y dimensions, i.e., the method does not know if an edge pixel is along the X dimension or Y dimension of the received bitmap. What is also provided herein is a method that doesn't distinguish between horizontally-oriented two-color edges or vertically-oriented two-color edges.

A method is needed for trapping a different number of pixels in the X and Y dimensions for those instances wherein printing resolutions in the X and Y dimensions are different. This is also desirable when the amount of misregistration is different along the X and Y axis, or when an engine artifact, such as trailing edge deletion, occurs only along one axis. For example, if the printing resolution is 1200×600 dpi, and we want to trap the equivalent of one 600 dpi pixel in both dimensions, that would require trapping two 1200 dpi pixels (one cyan edge pixel and one magenta edge pixel) in the X dimension, and one 600 dpi pixel (one magenta edge pixel) in the Y dimension. To solve this problem, a 5×3 window is used to obtain countM and a 5×5 window is used to obtain countC, in the same manner as described above, and then countM is scaled upward to match the counts obtained for the 5×5 window. In the instance wherein countM is obtained using a 5×3 windows and countC is obtained using a 5×5 window, countM is multiplied by 5/3. Alternatively, countM is multiplied by 2.

Figure 12A:
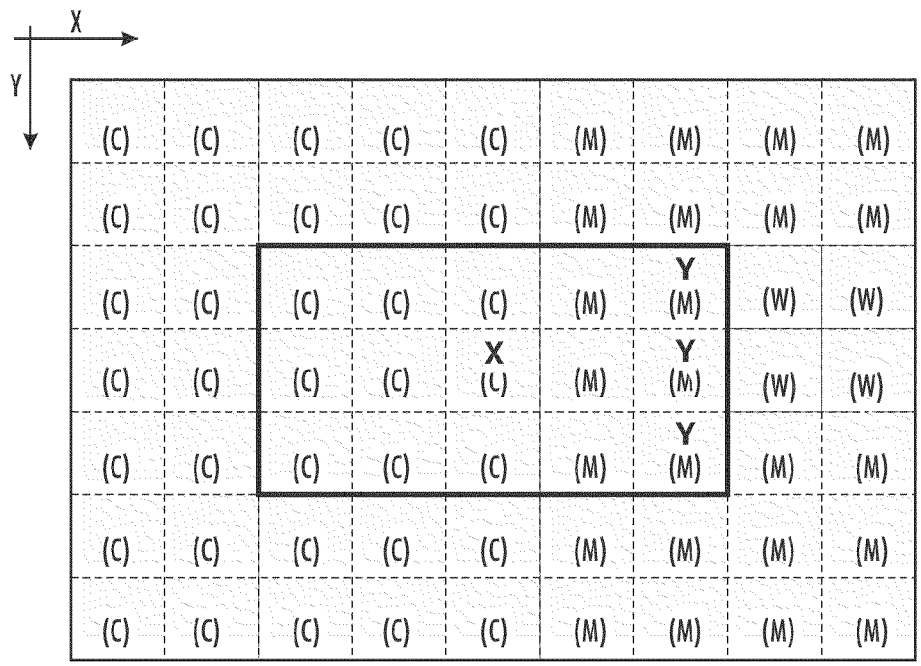
FIGS. 12A-B shows a candidate cyan pixel "X" being qualified along a vertically-oriented two-color edge.
Figure 12B:
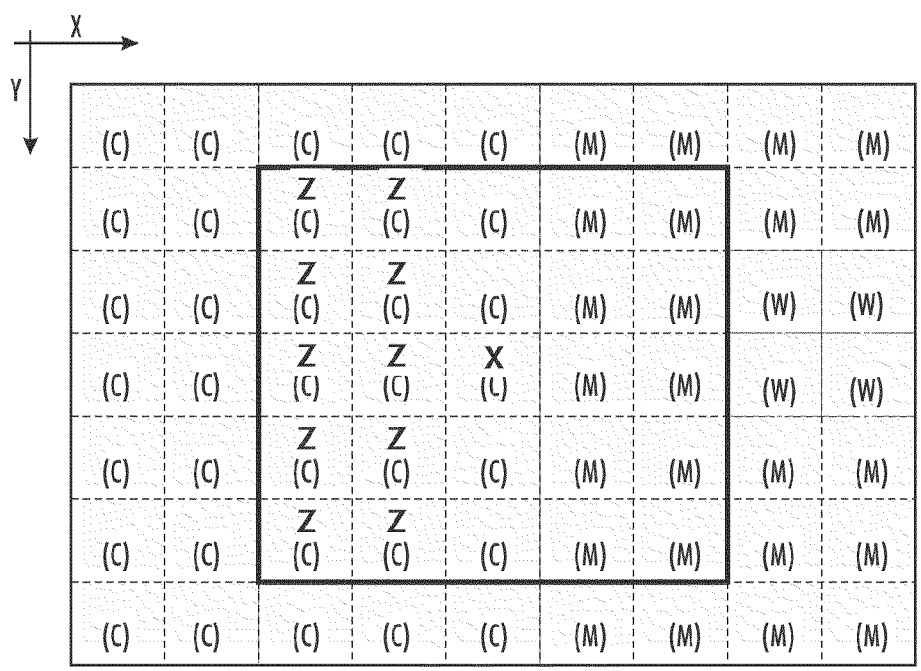

Reference is now made to FIGS. 12A-B showing a candidate cyan pixel "X" being qualified along a vertically-oriented two-color edge. A 5×3 window is centered on pixel "X". As discussed above, a 3×3 window is used to define a neighborhood of adjacent pixels. The 3×3 window is repeated shifted over each pixel (except over the candidate pixel). The above-methodology is applied and pixels are labeled "Z", "Y", or given no label at all.

In FIG. 12A, each pixel in the 5×3 window having at least one adjacent magenta pixel but no adjacent cyan pixels is labeled "Y". The total pixels marked "Y" is counted. In FIG. 12A, countM=3. This is then multiplied by 2. Thus, countM=3×2=6. To obtain countC a 5×5 window is used. Pixels in the 5×5 window of FIG. 12B having at least one adjacent cyan pixel but no adjacent magenta pixels are labeled "Z". The total number of "Z" pixels are counted. In FIG. 12B, countC=10. To qualify a cyan pixel "X" as an edge pixel eligible for color trapping on the cyan side of the cyan-magenta edge, the relationship of Eq. 2 must be satisfied. In this instance, (countM=6>countT=2) AND (countC=10>countM=6). The relationship is satisfied. Thus, the candidate cyan pixel "X" is a qualified edge pixel for color trapping on the cyan side of the cyan-magenta edge.

Figure 13A:
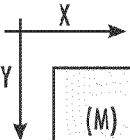
FIGS. 13A-B shows a candidate cyan pixel "X" being qualified along a horizontally-oriented two-color edge.

In FIG. 13A, along a horizontal two-color edge, a 5×3 window is used to obtain countM. There are no pixels with at least one adjacent magenta pixel and no adjacent cyan pixels. All the pixels with adjacent magenta pixels have at least one adjacent cyan pixel. So countM=0. Thus, there are no pixels labeled "Y" in FIG. 13A.

Figure 13B:
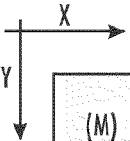

In FIG. 13B, a 5×5 window is used to obtain countC. There are 10 pixels which have at least one adjacent cyan pixel but no adjacent magenta pixels. These are labeled "Z". To qualify a cyan pixel "X" as an edge pixel eligible for color trapping on the cyan side of the cyan-magenta edge, the relationship of Eq. 2 must be satisfied. In this instance, (countM=0>countT=2) AND (countC=10>countM=0). The relationship is not satisfied. Thus, the candidate cyan pixel "X" is not a qualified edge pixel for trapping on the cyan side of the cyan-magenta edge. Cyan pixel "X" in the window of FIG. 13 is excluded for trapping. As shown, the use of a 5×3 window, in one instance, allowed for trapping of as candidate cyan pixel along a vertical edge (FIGS. 12A-B) but disallowed trapping of the same cyan pixel along a horizontal edge (FIGS. 13A-B).

Next will be demonstrated how one cyan pixel and one magenta pixel will be trapped in the X dimension (vertical edge).

Figure 14A:
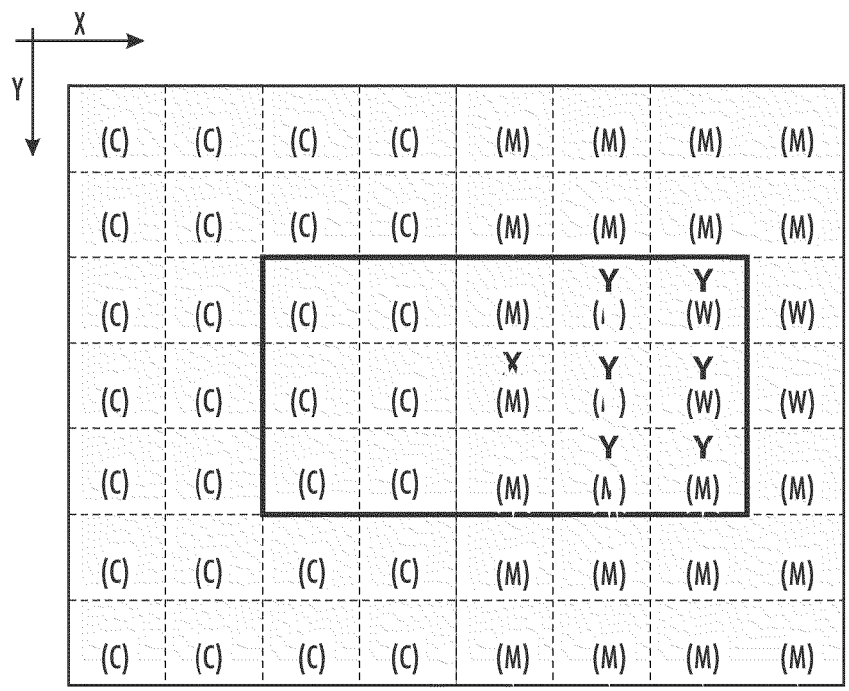
FIGS. 14A-B illustrate another embodiment of the present color trapping method.
Figure 14B:
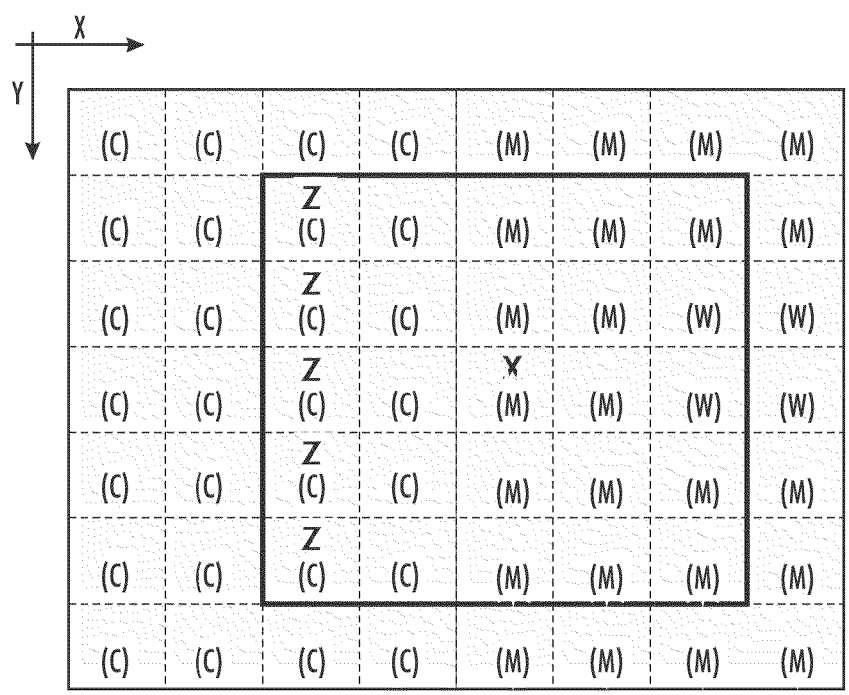

Reference is now being made to FIG. 14A. A 5×3 window is centered about a candidate magenta pixel "X". There are a total of 6 pixels with at least one adjacent magenta pixel and no adjacent cyan pixels (labeled "Y"). There are a total of 6 pixels labeled "Y". Thus, countM=6. When multiplied by 2, countM=6×2=12. A 5×5 window is used for the determination of countC, as shown in FIG. 14B. Pixels with at least one adjacent cyan pixel and no adjacent magenta pixels are labeled "Z". Thus, countC=5. To qualify the candidate pixel "X" as an edge pixel for color trapping on the magenta side of the cyan-magenta edge, (countC=5>countT=2) AND (countM=12>countC=5). Eq. 1 is satisfied. Thus, the candidate pixel is an edge pixel qualified for trapping on the magenta side of the cyan-magenta edge. FIG. 12A-B demonstrated that the candidate pixel "X" was a qualified edge pixel on the cyan side of the cyan-magenta edge. Therefore, one cyan pixel and one magenta pixel were trapped in the X dimension (vertical edge).

Now, it will be shown that a magenta edge pixel is qualified for trapping and a cyan edge pixel is not qualified for trapping in the Y dimension (horizontal edge).

Figure 15A:
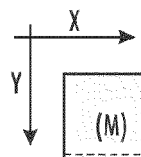
FIGS. 15A-B illustrate yet another embodiment of the present color trapping method.
Figure 15B:
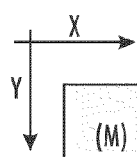

As was shown in FIG. 13, cyan edge pixel "X" was not a qualified edge pixel for trapping on the cyan side of the cyan-magenta edge (horizontal edge). In FIGS. 15A-B, a 5×3 window is centered about a candidate pixel "X" on the magenta side of the cyan-magenta edge. There are 5 pixels with at least one adjacent magenta pixel and no adjacent cyan pixels. Thus, 5 pixels in FIG. 15A are labeled "Y". So, countM=5. When multiplied by 2, countM=5×2=10. Next, a 5×5 window is used for the determination of countC. In FIG. 15B, pixels with at least one adjacent cyan pixel and no adjacent magenta pixels are labeled "Z". There are 5 pixels with at least one adjacent cyan pixel and no adjacent magenta pixels. To qualify the candidate pixel "X" as an edge pixel for trapping on the magenta side of the cyan-magenta edge, Eq. 1 must be satisfied. In this instance, (countC=5>countT=2) AND (countM=10>countC=5), thus this magenta edge pixel is qualified for trapping.

The following sums up the different scenarios for selecting the window to use for obtaining countM (a 5×5 window is always used to obtain countC):

When trapping an even number of pixels in both the X and Y dimensions: use a 5×5 window.

When trapping an odd number of pixels in both the X and Y dimensions: use a 5×5 window, but trap only the magenta edge pixel and do not trap the cyan edge pixel.

When trapping an even number of pixels in the X dimension and an odd number of pixels in the Y dimension: use a 5×3 window.

When trapping an odd number of pixels in the X dimension and an even number of pixels in the Y dimension: use a 3×5 window.

In summary, what has been disclosed are various embodiments of a color trapping method along with various features and enhancements thereto. Color edges are detected and edge pixels that need to be trapped are identified. Pixels qualified for color trapping can be up to a pre-determined number of pixels away from the color edge. Once qualified, estimates are obtained for the continuous-tone values for the dominant colors on either side of the edge based upon the halftone thresholds used for that area. Qualified edge pixels are re-halftoned using the estimated contone value of the dominant color on the opposing side of the two-color edge so that halftones for one color are extended beyond the edge into the other color.

Example Digital Document Reproduction System

Figure 16:
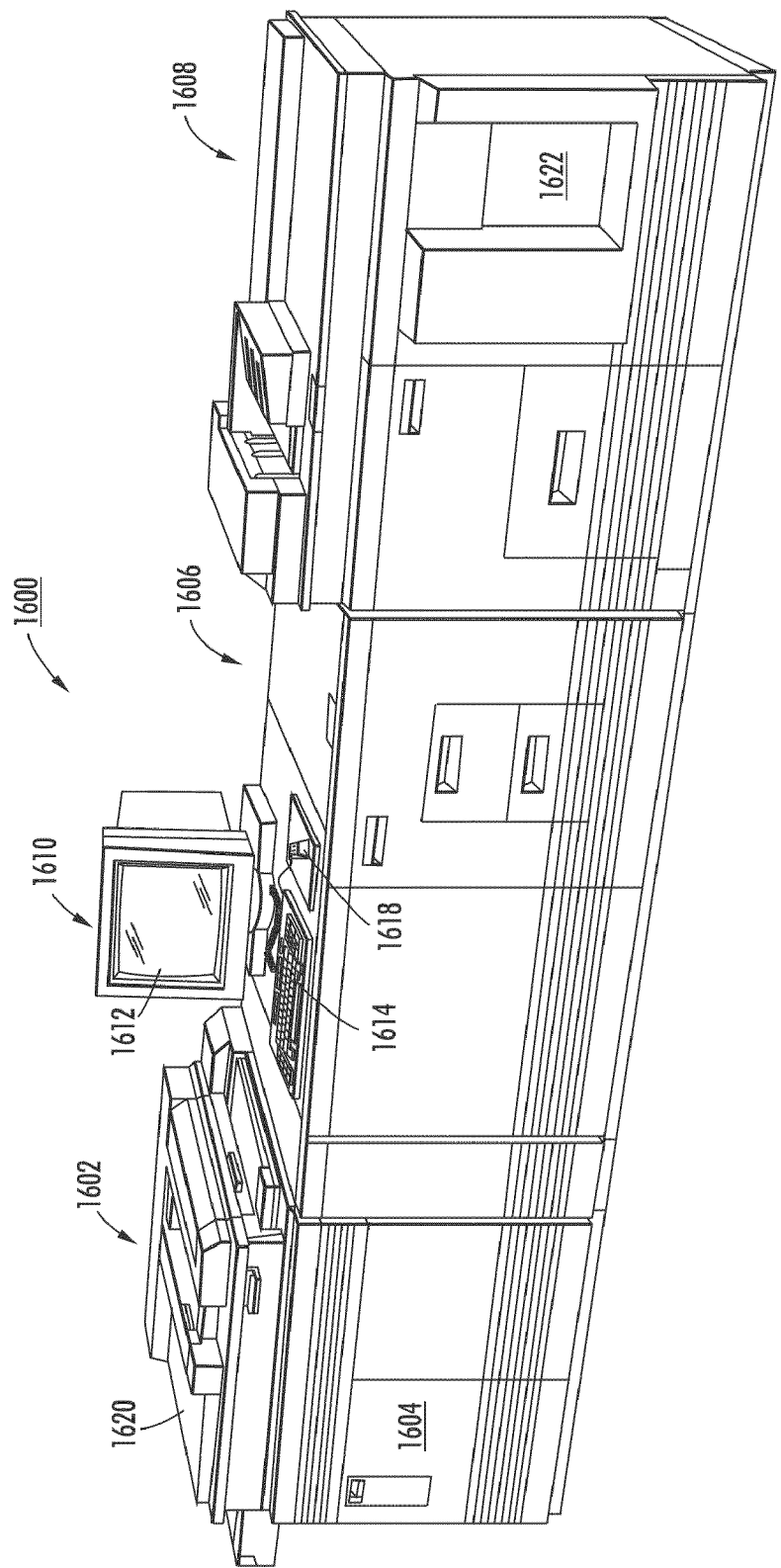
FIG. 16 illustrates one example document reproduction system wherein various aspects of the present color trapping method are likely to find their intended uses.

Reference is now being made to FIG. 16 which illustrates one example document reproduction system wherein various aspects of the present method are likely to find their intended uses.

Document reproduction system 1600 generally includes an input module 1602, a controller 1604, a document processing module 1606, and a printer module 1608. Document processing station 1610 includes a display 1612, keyboard 1614, and mouse 1618, for use by an operator to set system parameters or control device operations. Scanning device 1620 is used to receive a color image having a plurality of color pixels. The document processing station may further enable one or more aspects of the present color trapping method. Document processing module 1606 also includes a processor, memory, and storage. Printer module 1608 also includes processors and one or more device controllers for regulating the application of inks or toners onto paper as well as the control of papers moving through the printer module for proper registration in multi-channel color printing, and the like. The system includes one or more discharge areas 1622 where finished print/copy jobs are deposited for retrieval. Controller 1604 (internal to document reproduction system 1600) monitors and regulates the operation of scanning device 1620 for obtaining the pixel color values of the color image. The controller includes a processor for executing machine program instructions. The controller may take the form of any of a micro-processor, micro-controller, ASIC, FPGA, electronic circuit, or special purpose computer. The present method may also be implemented partially or fully in hardware in conjunction with machine executable instructions in communication with the controller. The controller also includes a network connection (not shown) for receiving data over a network such as an intranet or internet. The controller may also be in communication with one or more electronic media readers for the input of the color image.

One or more aspects of the present color trapping method may be carried out by a special purpose computer. Such a system could be implemented as a separate system, controller, circuit, ASIC, FPGA, and the like, integrated with a document reproduction system (of FIG. 16) having a scanning device for scanning a color image to obtain pixel color values. A special purpose computer includes a processor for executing machine readable instructions for carrying out the present method. The processor is in communication with a main memory which stores program instructions. A secondary memory may further be placed in communication with the processor. Such a secondary memory includes a hard disk or other storage device capable of reading/writing to a floppy disk, magnetic tape, optical disk, flash memory, memory stick, USB port, etc. The storage device is adapted to transfer of instructions and data to the processor. The system includes a communications interface which acts as both an input and an output to allow data to be transferred to external devices over a network. Example interfaces include a modem, network card, communications port, etc. Instructions transferred via the communications interface are in the form of signals. Such signal may be any of electronic, electromagnetic, optical, or other signals. These signals are provided to the communications interface via wire, cable, fiber optic, phone, cellular, RF, or other means known in the arts. The precise nature of the implementation of a special purpose computer will depend on the image processing environment wherein the present method finds its uses. A computer readable medium can store machine readable program instructions which, when mounted causes the special purpose computer (or the document reproduction system of FIG. 16) to perform the present color trapping method on the received input color image.

Terms such as, computer program medium, computer readable medium, computer executable medium, and computer usable medium are used herein to generally refer to a means for carrying program instructions for executing the present method for sale or transport. Such computer program products include a CD-ROM, DVD, tape, cassette, or other digital or analog media, capable of having embodied thereon one or more instructions or other machine executable codes or commands that implement one or more aspects of the present method. Computer readable medium additionally comprises any media capable of passing information between devices in a transitory state such as a network link or a network interface which may include a wired or wireless network.

It should be understood that the flow diagrams hereof are intended to be illustrative. Variations thereof are intended to fall within the scope of the appended claims.

One or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in, and the like, as are known in the arts. Such an article of manufacture may further be shipped, sold, leased, or otherwise provided either alone or as part of an add-on, update, upgrade, or product suite by the assignee or a licensee hereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for color trapping comprising:
receiving a bitmap of a halftoned color image having a plurality of pixels;
selecting a candidate pixel in an area of said bitmap having a two-color edge comprising a first side of a first dominant color and a second side of a second dominant color;
defining a window of size n×m centered on said candidate pixel;
determining whether said candidate pixel is an edge pixel qualified for trapping based upon color values of pixels in said window; and
in response to said candidate pixel being qualified as an edge pixel for trapping:
estimating continuous-tone color values for said first and second dominant colors of said two-color edge based upon halftone threshold values of the halftone screens used to color said area of said bitmap wherein said candidate pixel was selected;
assigning said continuous-tone color value estimated for said dominant color on an opposing side of said two-color edge to said candidate pixel;
re-halftoning said qualified edge pixel using said assigned continuous-tone color value to produce a new bitmap for said color image;
combining said new bitmap with said received bitmap to produce a new halftoned color image; and
providing said new halftoned color image to an image output device for rendering.

2. The method of claim 1, further comprising:
deleting at least one row of pixels immediately adjacent to said candidate pixel;
deleting at least one column of pixels immediately adjacent to said candidate pixel; and determining whether said candidate pixel is a qualified edge pixel based upon color values of pixels which are not in any deleted rows or columns of said window.

3. The method of claim 1, wherein determining whether said candidate pixel is qualified as an edge pixel comprises:
counting a number of pixels in said window having at least one adjacent pixel of said first dominant color and no adjacent pixels of said second dominant color to obtain a value for a first count, countC;
counting a number of pixels in said window having at least one adjacent pixel of said second dominant color and no adjacent pixels of said first dominant color to obtain a value for a second count, countM; and
using said first and second counts to qualify said candidate pixel as an edge pixel for trapping.

4. The method of claim 3, wherein using said first and second counts to qualify said candidate pixel on said second side of said two-color edge comprises determining whether ((countC>countT) AND (countM>countC)), where countT$\geq$2.

5. The method of claim 3, wherein using said first and second counts to qualify said candidate pixel as an edge pixel for trapping on said first side of said two-color edge comprises determining whether ((countM>countT) AND (countC>countM)), where countT is $\geq$2.

6. The method of claim 3, further comprising:
defining a square window of size n=m and using said square window to obtain countC;
defining a rectangle window of size n≠m and using said rectangle window to obtain countM; and
scaling countM upward to match the counts obtained using said square window to determine countC.

7. The method of claim 1, wherein estimating said continuous-tone color value comprises selecting a color value $C_i$ from a range given by $T_{c1} < C_i \leq T_{c2}$, for said area of said bitmap wherein said candidate pixel was selected, where $T_{c1}$ is the maximum halftone threshold value of the halftone screen that corresponds to an ON-pixel, and $T_{c2}$ is the minimum halftone threshold value of the halftone screen that corresponds to an OFF-pixel.

8. A system for color trapping comprising:
a memory;
a storage medium for storing data; and
a processor in communication with said memory and said storage medium, said processor executing machine readable instructions for performing:
receiving a bitmap of a halftoned color image having a plurality of pixels;
selecting a candidate pixel in an area of said bitmap having a two-color edge comprising a first side of a first dominant color and a second side of a second dominant color;
defining a window of size n×m centered on said candidate pixel;
determining whether said candidate pixel is an edge pixel qualified for trapping based upon color values of pixels in said window; and
in response to said candidate pixel being qualified as an edge pixel for trapping:
estimating continuous-tone color values for said first and second dominant colors of said two-color edge based upon halftone threshold values of the halftone screens used to color said area of said bitmap wherein said candidate pixel was selected;
assigning said continuous-tone color value estimated for said dominant color on an opposing side of said two-color edge to said candidate pixel;
re-halftoning said qualified edge pixel using said assigned continuous-tone color value to produce a new bitmap for said color image;
combining said new bitmap with said received bitmap to produce a new halftoned color image; and
providing said new halftoned color image to an image output device for rendering.

9. The system of claim 8, further comprising:
deleting at least one row of pixels immediately adjacent to said candidate pixel;
deleting at least one column of pixels immediately adjacent to said candidate pixel; and
determining whether said candidate pixel is a qualified edge pixel based upon color values of pixels which are not in any deleted rows or columns of said window.

10. The system of claim 8, wherein determining whether said candidate pixel is qualified as an edge pixel comprises:
counting a number of pixels in said window having at least one adjacent pixel of said first dominant color and no adjacent pixels of said second dominant color to obtain a value for a first count, countC;
counting a number of pixels in said window having at least one adjacent pixel of said second dominant color and no adjacent pixels of said first dominant color to obtain a value for a second count, countM; and
using said first and second counts to qualify said candidate pixel as an edge pixel for trapping.

11. The system of claim 10, wherein using said first and second counts to qualify said candidate pixel on said second side of said two-color edge comprises determining whether ((countC>countT) AND (countM>countC)), where countT$\geq$2.

12. The system of claim 10, wherein using said first and second counts to qualify said candidate pixel as an edge pixel for trapping on said first side of said two-color edge comprises determining whether ((countM>countT) AND (countC>countM)), where countT is $\geq$2.

13. The system of claim 10, further comprising:
defining a square window of size n=m and using said square window to obtain countC;
defining a rectangle window of size n≠m and using said rectangle window to obtain countM; and
scaling countM upward to match the counts obtained using said square window to determine countC.

14. The system of claim 8, wherein estimating said continuous-tone color value comprises selecting a color value $C_i$ from a range given by $T_{c1} < C_i \leq T_{c2}$, for said area of said bitmap wherein said candidate pixel was selected, where $T_{c1}$ is the maximum halftone threshold value of the halftone screen that corresponds to an ON-pixel, and $T_{c2}$ is the minimum halftone threshold value of the halftone screen that corresponds to an OFF-pixel.

15. A method for color trapping comprising:
receiving a bitmap of a halftoned color image having a plurality of pixels;
selecting a candidate pixel in an area of said bitmap having a two-color edge comprising a first side of a first dominant color and a second side of a second dominant color;
defining a window of size n×m centered on said candidate pixel;
determining whether said candidate pixel is an edge pixel qualified for trapping based upon color values of pixels in said window, comprising:
counting a number of pixels in said window having at least one adjacent pixel of said first dominant color and no adjacent pixels of said second dominant color to obtain a value for a first count, countC;

counting a number of pixels in said window having at least one adjacent pixel of said second dominant color and no adjacent pixels of said first dominant color to obtain a value for a second count, countM; and using said first and second counts to qualify said candidate pixel as an edge pixel for trapping; and in response to said candidate pixel being qualified as an edge pixel for trapping:

estimating continuous-tone color values for said first and second dominant colors of said two-color edge based upon halftone threshold values of the halftone screens used to color said area of said bitmap wherein said candidate pixel was selected;

assigning said continuous-tone color value estimated for said dominant color on an opposing side of said two-color edge to said candidate pixel;

re-halftoning said qualified edge pixel using said assigned continuous-tone color value to produce a new bitmap for said color image;

combining said new bitmap with said received bitmap to produce a new halftoned color image; and providing said new halftoned color image to an image output device for rendering.

16. The method of claim 15, further comprising:

deleting at least one row of pixels immediately adjacent to said candidate pixel;

deleting at least one column of pixels immediately adjacent to said candidate pixel; and determining whether said candidate pixel is a qualified edge pixel based upon color values of pixels which are not in any deleted rows or columns of said window.

17. The method of claim 15, wherein using said first and second counts to qualify said candidate pixel on said second side of said two-color edge comprises determining whether ((countC>countT) AND (countM>countC)), where countT$\geq$2.

18. The method of claim 15, wherein using said first and second counts to qualify said candidate pixel as an edge pixel for trapping on said first side of said two-color edge comprises determining whether ((countM>countT) AND (countC>countM)), where countT is $\geq$2.

19. The method of claim 15, wherein estimating said continuous-tone color value comprises selecting a color value $C_i$ from a range given by $T_{c1} < C_i \leq T_{c2}$, for said area of said bitmap wherein said candidate pixel was selected, where $T_{c1}$ is the maximum halftone threshold value of the halftone screen that corresponds to an ON-pixel, and $T_{c2}$ is the minimum halftone threshold value of the halftone screen that corresponds to an OFF-pixel.

20. The method of claim 15, further comprising:

defining a square window of size n=m and using said square window to obtain countC;

defining a rectangle window of size n$\neq$m and using said rectangle window to obtain countM; and scaling countM upward to match the counts obtained using said square window to determine countC.

* * * * *